(12) United States Patent
Kukita

(10) Patent No.: US 10,521,972 B2
(45) Date of Patent: Dec. 31, 2019

(54) INFORMATION TERMINAL

(71) Applicant: Universal Entertainment Corporation, Koto-ku, Tokyo (JP)

(72) Inventor: Noritoshi Kukita, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 16/120,378

(22) Filed: Sep. 3, 2018

(65) Prior Publication Data

US 2018/0374277 A1  Dec. 27, 2018

Related U.S. Application Data

(63) Continuation of application No. 15/551,450, filed as application No. PCT/JP2016/053616 on Feb. 8, 2016, now Pat. No. 10,096,171.

(30) Foreign Application Priority Data

Feb. 18, 2015  (JP) ................................ 2015-029779
Feb. 18, 2015  (JP) ................................ 2015-029780

(51) Int. Cl.
| | | |
|---|---|---|
| *G07B 1/00* | (2006.01) |
| *G07D 7/005* | (2016.01) |
| *G07D 7/00* | (2016.01) |
| *G06F 1/16* | (2006.01) |
| *G07F 17/32* | (2006.01) |
| *G07D 9/00* | (2006.01) |

(52) U.S. Cl.
CPC ................. *G07B 1/00* (2013.01); *G06F 1/16* (2013.01); *G07D 7/003* (2017.05); *G07D 7/005* (2017.05); *G07D 9/00* (2013.01); *G07F 17/3202* (2013.01); *G07D 2211/00* (2013.01)

(58) Field of Classification Search
CPC ......... G07B 1/10; G07F 1/16; G07F 17/3202; G07F 19/205; G07F 9/10; G07D 2211/00; G07D 7/003; G07D 7/005; G07D 9/00; G07D 11/00; G07D 11/10; G07D 11/40
See application file for complete search history.

(56) References Cited

U.S. PATENT DOCUMENTS

2005/0077995 A1* 4/2005 Paulsen .............. G07C 9/00039
                                                                 340/5.6
2009/0057398 A1* 3/2009 Douglass ................ G07F 19/20
                                                                 235/379

* cited by examiner

*Primary Examiner* — Mark J Beauchaine
(74) *Attorney, Agent, or Firm* — Potomac Law Group, PLLC; Kenneth Fagin

(57) ABSTRACT

An information terminal which allows an increase in a manufacturing cost to be suppressed is disclosed. A ticket printer is held above a paper sheet processing device. A guide by which a ticket or the like ejected from a ticket ejection slot of the ticket printer is guided and an insertion slot of a paper sheet processing device are held in a state in which the guide and the insertion slot have a predetermined angle. A ticket or the like which is printed by the ticket printer is supplied from the ticket ejection slot of the ticket printer via the guide to an opening part of a bezel. On the other hand, a paper sheet which is inserted into the paper sheet processing device is supplied from the opening part of the bezel to the insertion slot of the paper sheet processing device.

8 Claims, 15 Drawing Sheets

INFORMATION TERMINAL

CROSS-REFERENCE TO RELATED APPLICATIONS

This application is a continuation of application Ser. No. 15/551,450 filed Aug. 16, 2017, the contents of which are incorporated by reference. That application was a national phase entry of PCT/JP2016/053616 filed Feb. 8, 2016, the contents of which are incorporated by reference. That PCT application was based on and claims the priority benefit of Japanese application numbers 2015-029779 and 2015-029780, both of which were filed on Feb. 18, 2015 and the contents of both of which are incorporated by reference.

TECHNICAL FIELD

The present invention relates to an information terminal which is operable to input and output a variety of pieces of information.

BACKGROUND ART

Conventionally, there has been known a gaming machine which includes a printer (ticket printer) for printing a coupon ticket with a bar code having an economic value or the like; and a bill validator for reading bills or the like, determining authenticity thereof, and providing a credit corresponding an economic value thereof when the bills are authentic. In the above-mentioned gaming machine, for example, the printer is located above a game display screen and on a left side thereof, and on the other hand, the bill validator is located on a right side of an operation panel arranged below the game display screen (refer to Patent Literature 1).

As described above, in general, an ejection slot for ejecting the coupon or the like printed by the printer and an insertion slot for inputting the bills or the like to the bill validator are configured to be separately formed bodies, respectively in positions which are largely separated from each other.

CITATION LIST

Patent Literature

Patent Literature 1: U.S. Unexamined Patent Application Publication No. 2011/0201409 Specification

SUMMARY OF THE INVENTION

Technical Problem

However, in a case where in an information terminal for providing predetermined information for a user, an ejection slot from which a coupon or the like printed by a printer is ejected and an insertion slot for inputting bills or the like to a paper sheet processing device such as a bill validator are separately configured, a manufacturing cost is likely to be increased.

Accordingly, an object of the present invention is to provide an information terminal which allows the increase in the manufacturing cost to be suppressed.

Solution to Problem

The present invention provides an information terminal described below.

An information terminal according to a first aspect of the present invention has the below-described configuration.

The information terminal (for example, a kiosk terminal 200) includes:

a printer (for example, a ticket printer 238) for ejecting printed matter from an ejection slot;

a paper sheet processing device (for example, a paper sheet processing device 240) into which a paper sheet is inserted from an insertion slot; and an opening part (for example, an opening part 206a of a bezel 206) being opened on a front face (for example, a front panel 214a located on a front face of the kiosk terminal 200), and the printed matter is ejected via the opening part, the printed matter having been guided from the ejection slot to the opening part, and the paper sheet is inserted via the opening part being in common with the opening part to which the printed matter is guided.

By employing the above-described configuration, the ejection slot of the printer and the insertion slot of the paper sheet processing device are configured to be guided to the common opening part arranged on the front face, whereby a front face portion of the information terminal is simply configured and it is made possible to suppress an increase in a manufacturing cost.

In the first aspect, the information terminal according to a second aspect of the present invention further has the below-described configuration.

In the information terminal, an ejection path (for example, a path indicated by a dotted line arrow B shown in FIG. 8 which passes a guide 501 and a ticket ejection slot 301) through which the printed matter is caused to pass from the ejection slot to the opening part and an insertion path (for example, a path indicated by a dotted line arrow C shown in FIG. 8 which passes an insertion slot 401) through which the paper sheet is caused to pass from the opening part to the insertion slot are arranged to have a predetermined angle (for example, an angle D shown in FIG. 8).

By employing the above-described configuration, since the ejection path and the insertion path are arranged to have the predetermined angle, the inputted paper sheet or the like can be prevented from erroneously being supplied toward the ejection path of the printer, thereby avoiding a paper jam.

In the second aspect, the information terminal according to a third aspect of the present invention further has the below-described configuration.

In the information terminal, the ejection path is located above the insertion path and is arranged to be tilted toward the opening part.

By employing the above-described configuration, it is made possible to effectively utilize an installation space in a game hall. In other words, it is often the case that a plurality of information terminals are installed side by side, and if a conveyance path which includes the ejection path and the insertion path is arranged in a lateral direction, the information terminal becomes large-sized in the lateral direction, thereby leading to an increase in the installation space. Therefore, the conveyance path is arranged in a longitudinal direction, thereby taking no wasteful installation space and enabling effective utilization of a game hall space.

In the first aspect, the information terminal according to a fourth aspect of the present invention further has the below-described configuration.

The information terminal is configured to further include a single notification part (for example, a bezel LED 242)

being controlled to perform notification related to processing of the printer and processing of the paper sheet processing device.

By employing the above-described configuration, the notification related to the processing of the printer and the processing related to the paper sheet processing device is performed by the common notification part, thereby allowing a user to obtain the information pertinent to the processing of the printer and the processing of the paper sheet processing device.

Advantageous Effects of the Invention

By employing a configuration of an information terminal according to the present invention, while a printer and a paper sheet processing device are held as different individual devices, an ejection slot of the printer and an insertion slot of the paper sheet processing device are configured to be connected to a common bezel provided on a front face, whereby a front face portion of an information terminal is simply configured and it is made possible to suppress an increase in a manufacturing cost.

DESCRIPTION OF EMBODIMENTS

An information terminal according to one embodiment of the present invention will be described with reference to the accompanying drawings. It is to be noted that in the present embodiment, a kiosk terminal which is one of information terminals will be described as an example.

[Configuration of Kiosk Terminal]

Figure 1:
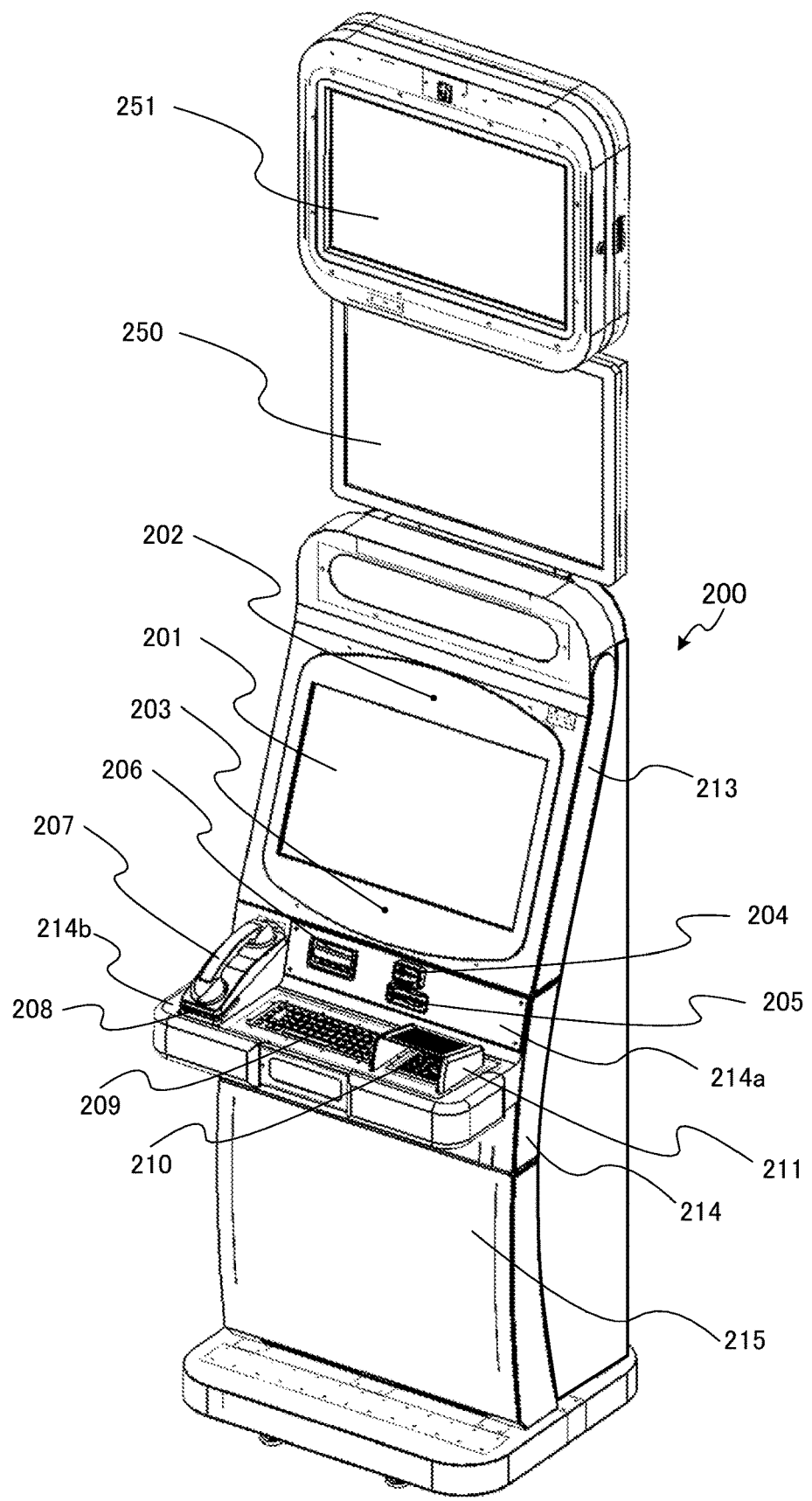
FIG. 1 is a view illustrating an overall structure of a kiosk terminal according to one embodiment of the present invention.

In FIG. 1, a kiosk (KIOSK) terminal 200 according to the present embodiment is shown. The kiosk terminal 200 is, for example, an information terminal which is installed in a variety of stores and is used, for example, to display information or the like useful for customers and can be connected to a computer or the like for administering and managing a store via a network. It is to be noted that in the present specification, an apparatus which provides some sort of information for a user is defined as the information terminal, and as this information terminal, the kiosk terminal 200 according to the present embodiment and a gaming machine including a pachinko machine, a pachinko-slot machine, and the like are also included.

In addition, as shown in FIG. 1, on an upper portion of the kiosk terminal 200, an LCD 250 and an LCD 251 are located. In this example, each of the LCD 250 and the LCD 251 has a touch panel function, is connected to the kiosk terminal 200, and is controlled to display a variety of pieces of information as needed.

In addition, a configuration may also be arranged such that instead of the LCD 250 and the LCD 251, an advertisement display board which is formed of paper is located and non-electronic information which does not electronically change is displayed thereon. The above-mentioned advertisement display board can be easily replaced manually by a staff member of a store or the like with other information board.

A housing of the kiosk terminal 200 includes: an upper front door 213 having an LCD 201 on an upper portion of a front face thereof; a middle front door 214 having a front panel 214a and a control panel 214b on a middle portion of the front face thereof; and a lower front door 215 on a lower portion of the front face thereof.

It is to be noted that each of the "doors" in the present specification is not limited to a door which rotates rightward and leftward around a rotation axis in a vertical direction, which is formed by hinges or the like, and includes doors in a variety of forms such as a door which is flapped up (or down) around a rotation axis in a horizontal direction, which is formed by hinges; a door which is pulled out in a horizontal direction along rail guides; and a door which is simply detached from a main body.

The LCD 201 is a liquid crystal display device having a touch panel function, and on this LCD, for example, information or the like pertinent to a store is displayed. It is to be noted that although in this example, the LCD 201 is configured to have the touch panel function, instructions may be inputted by other input devices such as the later-described keyboard 209 and numeric keypad 210.

Further, the kiosk terminal 200 includes motion sensors 202 and 203 above and below the LCD 201, respectively. The motion sensors 202 and 203 are, for example, cameras, and images shot by the motion sensors 202 and 203 are used to analyze behavior of a user of the kiosk terminal 200 and customers passing along passages.

On the front panel 214a of the middle front door 214, a touch unit 204 is located. The touch unit 204 includes an RFID module which is operable to perform data communication with a non-contact IC card, and a mobile phone and a smartphone, each of which has a communication function by NFC. A member in a store holds a membership card (IC card) associated with the member over this touch unit 204, thereby allowing the member to log in and a member menu screen and information pertinent to the member to be displayed on the LCD 201.

In addition to the touch unit 204 or instead of the touch unit 204, the kiosk terminal 200 may include an information recording medium reading device for reading information stored in an information recording medium such as a magnetic card. In this case, instead of the IC card, the magnetic card can be used as a membership card.

In addition, a staff member of a store holds an IC card of the staff member thereover, can thereby log therein, and can display a menu screen for staff or the like on the LCD 201.

On the front panel 214a of the middle front door 214, further, a card insertion slot 205 of a card unit 230 is located, and insertion and taking-out of an IC card as well as ejection of a newly issued IC card can be conducted. In addition, the card insertion slot 205 is provided with an eject button 230c. Here, the card insertion slot 205 is configured as a part of the card unit 230.

When a membership card is inserted from the card insertion slot 205, a member menu screen and information pertinent to that member can be displayed on the LCD 201. In addition, the card unit 230 can issue a special card (for example, an IC card for which some added value is provided on a predetermined condition) or the like and can collect an IC card.

In addition, on the front panel 214a of the middle front door 214, a common bezel 206 which is connected to an ejection slot of printed matter ejected from a ticket printer 238 and an insertion slot for inserting a paper sheet into a paper sheet processing device 240 is located. For example, a ticket or a coupon is printed (issued) by the ticket printer 238 and is ejected from the bezel 206 connected to the ejection slot. In addition, for example, when a ticket or a coupon is inserted from the bezel 206 connected to the insertion slot, the ticket or the like is collected by the paper sheet processing device 240, and after information of the ticket has been read, processing in accordance with said read information is conducted.

In addition, the bezel 206 is provided with a bezel LED 242 which lights up in conjunction with processing of the ticket printer 238 and processing of the paper sheet processing device 240. It is to be noted that the paper sheet processing device 240 may be a bill validator having a bill identification function.

In addition, on an upper face of the control panel 214b which is formed as a bulging part bulging (protruding) from the middle front door 214, a phone receiver 207 used in a phone call by VoIP is located. A user of the kiosk terminal 200 can have conversation with a user of other kiosk terminal 200 or a staff member in a game facility via the phone receiver 207. In addition, an incoming LED 208 located on a mounting part on which the phone receiver 207 is mounted is controlled to emit light upon incoming of a phone call by the VoIP.

Further, on the upper face of the control panel 214b, a keyboard 209 and a numeric keypad 210 which a user uses to input data are located. Further, on both sides and an upper side of the numeric keypad 210, a keypad guard 211 for peep prevention is provided.

Behind the lower front door 215 of the kiosk terminal 200 (inside of the housing of the kiosk terminal 200), the later-described controller 220 and a control part for controlling LCDs, LEDs, and the like are housed.

[Configuration of Circuitry of Kiosk Terminal]

Figure 2:
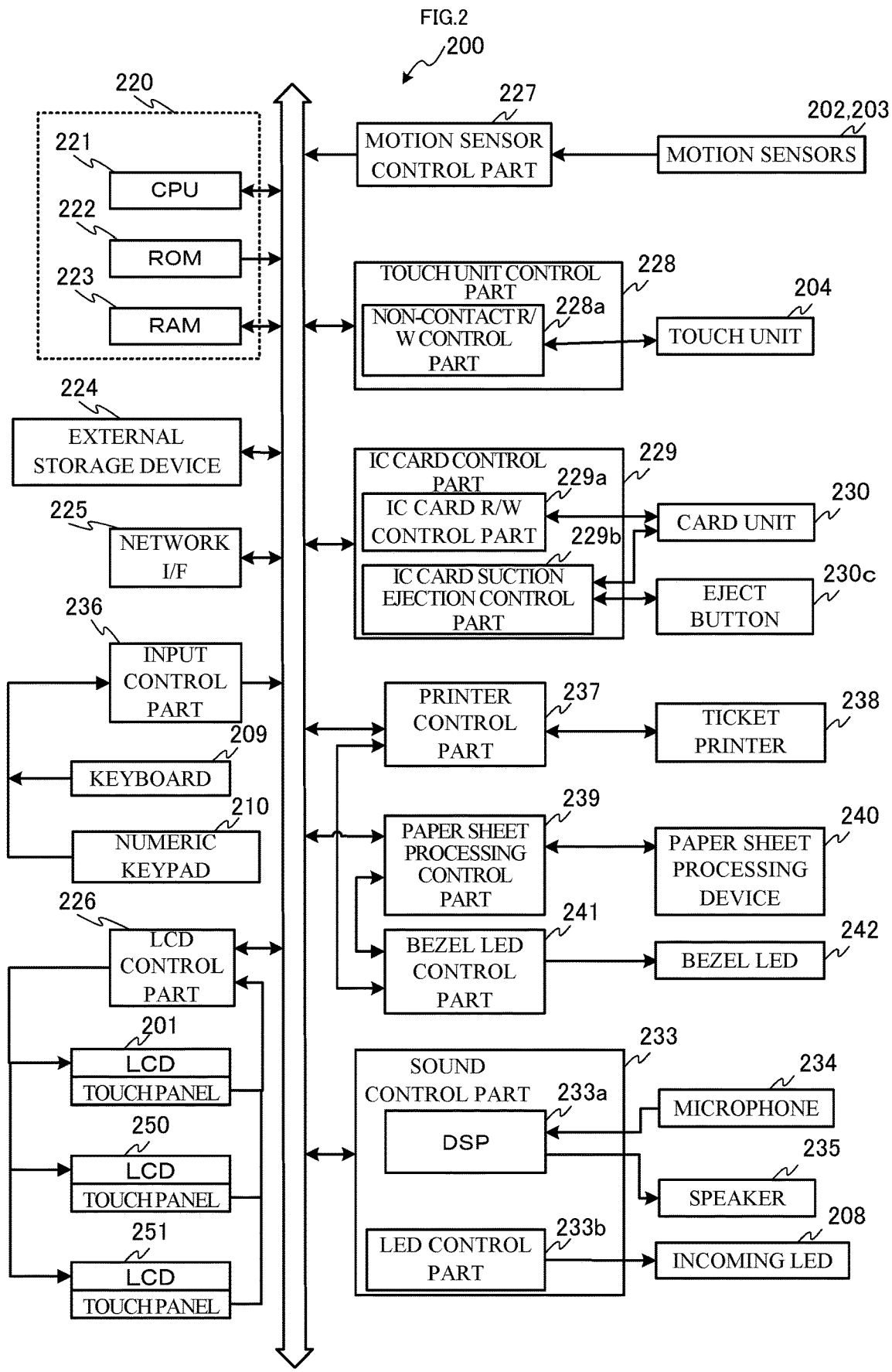
FIG. 2 is a diagram showing a circuitry configuration of the kiosk terminal according to the one embodiment of the present invention.

Next, with reference to FIG. 2, a configuration of circuitry which a kiosk terminal 200 includes will be described.

A controller 220 for controlling the kiosk terminal 200 has a CPU 221, a ROM 222, and a RAM 223.

The CPU 221 performs execution control of respective components of the kiosk terminal 200, executes various kinds of programs stored in the ROM 222, and performs computation therefor.

The ROM 222 is constituted of a memory device such as a flash memory, and permanent data used for the execution by the CPU 221 is stored therein. For example, a communication control program by VoIP and the like can be stored therein.

The RAM 223 temporarily stores data required upon executing the various kinds of programs stored in the ROM 222.

An external storage device 224 is, for example, a storage device such as a hard disk device and stores programs executed in the CPU 221 and data which the programs executed in the CPU 221 use.

A network I/F (interface) 225 realizes data communication with a computer in a store, a server on the Internet, and the like.

An LCD control part 226 controls the LCD 201, the LCD 250, and the LCD 251 to display a variety of pieces of information thereon. In addition, each of the LCD 201, the LCD 250, and the LCD 251 has a touch panel function, and an operation on each touch panel by a user is transmitted to the CPU 221.

A motion sensor control part 227 obtains images of a user and the like received from motion sensors (for example, cameras) 202 and 203, subjects the images to predetermined image processing as needed, and transmits the processed data to the CPU 221.

A touch unit control part 228 controls data transmission and reception in association with a touch operation of an IC card or a mobile phone on a touch unit 204. The touch unit control part 228 includes a non-contact R/W (reader/writer) control part 228a.

The non-contact R/W control part 228a determines whether or not there has been the touch operation of an IC card or a mobile phone on the touch unit 204 and when there has been the touch operation, obtains a read result or the like from the touch unit 204. The touch unit 204 has an antenna part for performing data transmission and reception with an IC card or a mobile phone through NFC or the like.

An IC card control part 229 controls insertion and ejection of an IC card, reading of data, and the like. The IC card control part 229 includes an IC card R/W (reader/writer) control part 229a and an IC card suction ejection control part 229b.

The IC card R/W control part 229a controls a card unit 230 to read an identification code or the like stored on an IC card. The card unit 230 has an antenna part for writing data through NFC or the like into an IC card.

The IC card suction ejection control part 229b controls suction and ejection of an IC card. When an IC card is inserted into a card insertion slot 205 by a user, the IC card suction ejection control part 229b controls the IC card to be held in the card unit 230 until the user logs off. In addition, when an eject button is pressed, the IC card suction ejection control part 229b ejects the IC card.

In addition, the card unit 230 includes a stacker which is capable of holding a plurality of IC cards so as to allow an IC card to be newly issued on a predetermined condition. It is to be noted that although in the present embodiment, the card unit 230 conducts the suction, the ejection, the issuance, and the like of an IC card, the card unit 230 can also be configured to handle other media (for example, a magnetic card, and the like).

A ticket printer control part 237 controls a ticket printer 238, for example, to print (issue) a ticket and a coupon.

A paper sheet processing control part 239 controls a paper sheet processing device 240, for example, to collect a ticket and a coupon and to conduct processing in accordance with information read from the ticket and the like. As described above, the paper sheet processing control part 239 and the paper sheet processing device 240 may be configured as a bill validator for handling bills.

A bezel LED control part 241 is connected to the ticket printer 238 and the paper sheet processing device 240 and controls a bezel LED 242 to light up in conjunction with processing of the ticket printer 238 and the paper sheet processing device 240. For example, when a user is operating the kiosk terminal 200, at timing when a ticket is printed and ejected, the bezel LED 242 is controlled to light up, and when a user is prompted to insert a coupon, the bezel LED 242 is controlled to light up. In addition, the bezel LED 242 may light up in any mode.

Here, the lighting-up mode of the bezel LED 242 can also be set such that a lighting-up mode related to the processing of the ticket printer 238 is different from a lighting-up mode related to the processing of the paper sheet processing device 240.

It is to be noted that although in this example, the bezel LED 242 is configured to light up in conjunction with the processing of the ticket printer 238 and the processing of the paper sheet processing device 240, in order to conduct notification to a user, another notification device which is different from the bezel LED 242 may be used.

A sound control part 233 inputs and outputs sounds by using a microphone 234 and a speaker 235 which are included in a phone receiver 207. The sound control part 233 includes a DSP 233a and an LED control part 233b. The DSP 233a performs control through predetermined sound signal processing related to sound inputting from the microphone 234 and sound outputting from the speaker 235. The LED control part 233b controls an incoming LED 208 to emit light based on an incoming signal by a VoIP phone call or the like.

An input control part 236 converts input on a keyboard 209 and input on a numeric keypad 210 from a user to signals and transmits the signals to the CPU 221.

[Configurations of Ticket Printer and Paper Sheet Processing Device]

Figure 3:
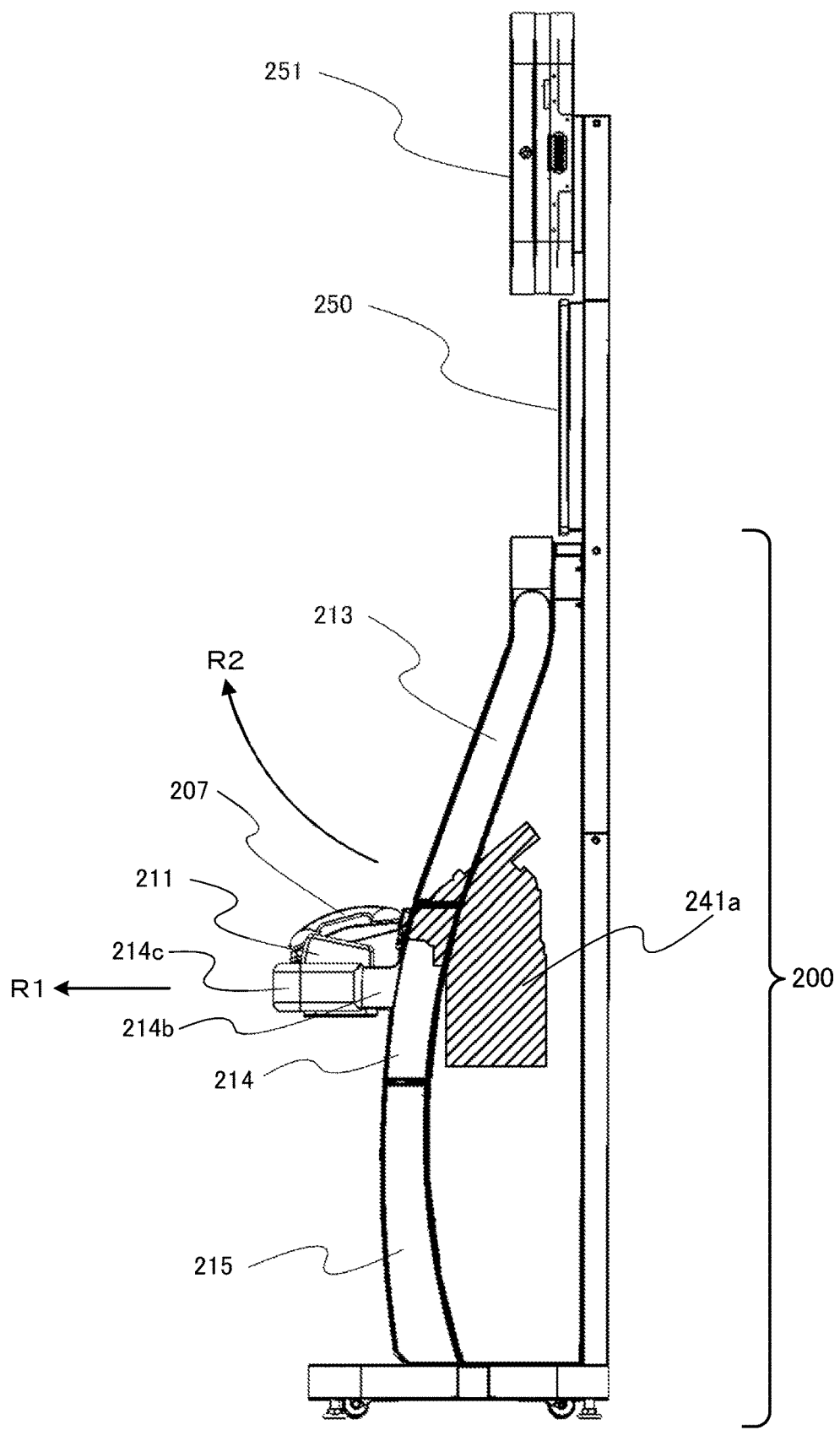
FIG. 3 is a side view illustrating positions of a ticket printer/a bill validator of the kiosk terminal according to the one embodiment of the present invention.

FIG. 3 is a side view showing a right side face of a kiosk terminal 200. FIG. 3 is a diagram illustrating positions where a ticket printer 238 and a paper sheet processing device 240 are located inside of a housing of the kiosk terminal 200. A hatched area 241a in FIG. 3 shows a silhouette of an apparatus which includes the ticket printer 238 and the paper sheet processing device 240. It is to be noted that in the hatched area 241a, a bezel 206 which is viewable from an outside of the kiosk terminal 200 is also included.

The kiosk terminal 200 is the same as that shown in FIG. 1, and on an upper side of the kiosk terminal 200, an LCD 250 and an LCD 251 are located. In addition, on an upper portion of a front face of the kiosk terminal 200, an upper front door 213 is located; on a middle portion of the front face, a middle front door 214 is located; and on a lower portion of the front face, a lower front door 215 is located.

In FIG. 3, further, a control panel 214b protruding from the middle front door 214 is shown, and on end portions of this control panel 214b, side cushions 214c are provided.

In addition, in FIG. 3, a phone receiver 207 and a keypad guard 211 located on an upper face of the control panel 214b are shown.

Figure 4:
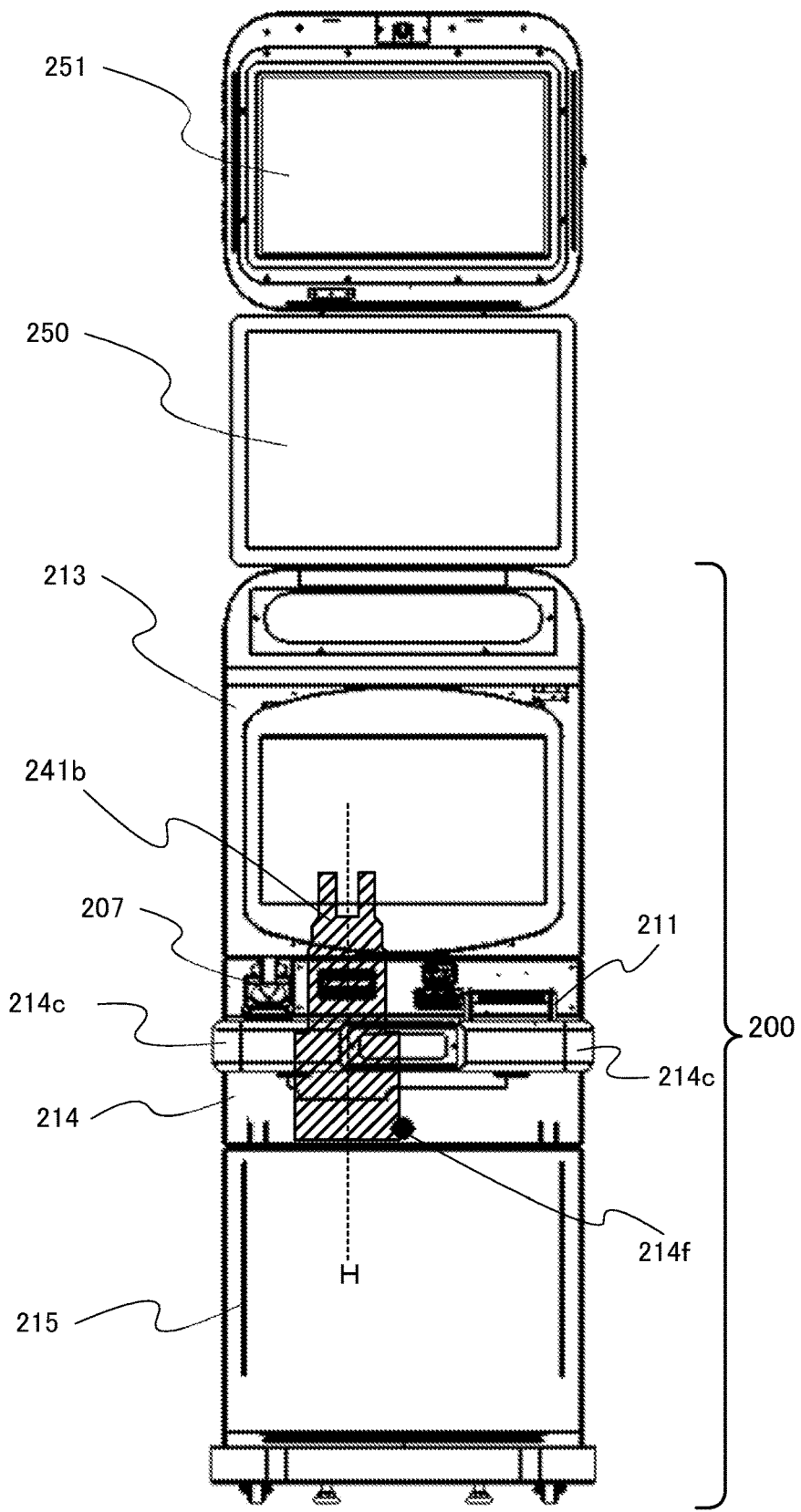
FIG. 4 is a front view illustrating of the positions of the ticket printer/the bill validator of the kiosk terminal according to the one embodiment of the present invention.

FIG. 4 is a front view showing a front face of the kiosk terminal 200. FIG. 4 is a diagram illustrating positions where the ticket printer 238 and the paper sheet processing device 240 are located inside of the housing of the kiosk terminal 200. A hatched area 241b in FIG. 4 shows a silhouette of the apparatus which includes the ticket printer 238 and the paper sheet processing device 240.

It is to be noted that the kiosk terminal 200 shown in FIG. 4 is the same as the kiosk terminal 200 shown in FIG. 3, and on the upper side of the kiosk terminal 200, the LCD 250 and the LCD 251 are located. In addition, on the upper portion of the front face of the kiosk terminal 200, the upper front door 213 is located; on the middle portion of the front face, the middle front door 214 is located; and on the lower portion of the front face, the lower front door 215 is located.

In a lower portion of the middle front door 214, a key hole 214f is located. By inserting a key into the key hole 214f and unlocking the middle front door 214, this middle front door 214 can be pulled out to the front side of the kiosk terminal 200 (in a direction indicated by an arrow R1 in FIG. 3).

It is to be noted that by pulling out the middle front door 214, an upper face of the lower front door 215 is exposed, and on said upper face, located is a key hole 215a (refer to FIG. 10, FIG. 11, and FIG. 15) into which a key (for example, a key which is different from the above-mentioned key of the middle front door 214) for detaching the lower front door 215 from the housing of the kiosk terminal 200 is inserted. In other words, the configuration is arranged such that until after the middle front door 214 has been pulled out, the lower front door 215 cannot be detached.

As described later, an upper end portion of the upper front door 213 and an upper end portion of the kiosk terminal 200 are connected by hinges, and with said connection part being a rotation axis, a lower end portion of the upper front door 213 is opened so as to flap up in an upward direction (a direction indicated by an arrow R2 in FIG. 3). However, in the present embodiment, the configuration is arranged such that one part of the lower end portion of the upper front door 213 is locked to the middle front door 214, and only when the middle front door 214 has been pulled out, the upper front door 213 is opened.

In addition, on the middle front door 214, the control panel 214b (refer to FIG. 3) is located, and on end portions of both sides of the control panel 214b, the side cushions 214c are provided. On the upper face of the control panel 214b, the phone receiver 207 and the keypad guard 211 are located.

Next, with reference to FIG. 5, configurations of the ticket printer 238 and the paper sheet processing device 240 will be described in detail. The bezel 206, a guide 501, the ticket printer 238, and the paper sheet processing device 240 shown in FIG. 5 correspond to the hatched area 241a show in FIG. 3 and the hatched area 241b shown in FIG. 4. In addition, in FIG. 5, a front panel 214a which includes a bezel opening part for causing one part of the bezel 206 to protrude to the front face of the kiosk terminal 200 is shown.

Figure 5:
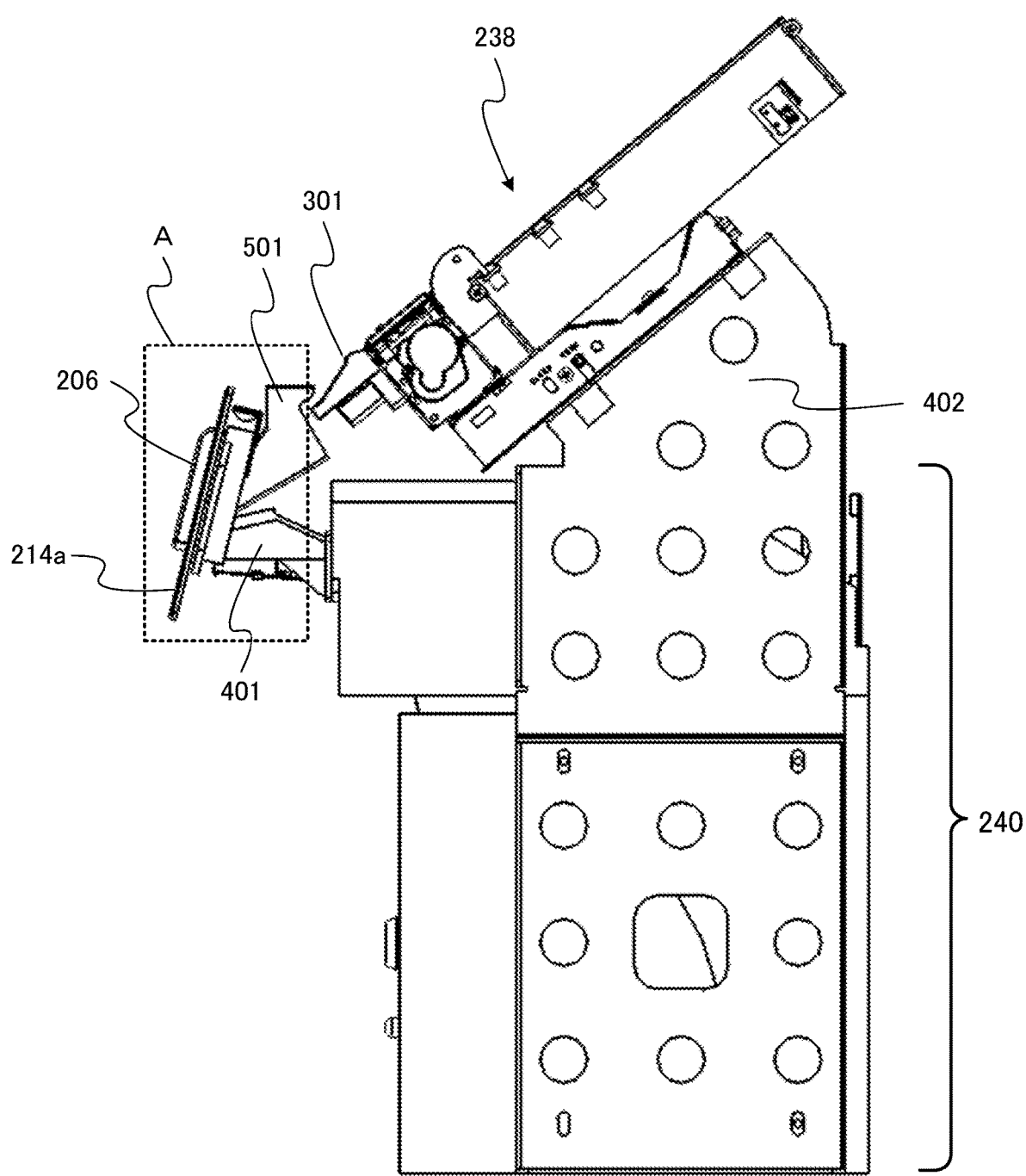
FIG. 5 is a side view illustrating configurations of the ticket printer/the bill validator of the kiosk terminal according to the one embodiment of the present invention in detail.

As shown in FIG. 5, the paper sheet processing device 240 is provided with an insertion slot 401. The ticket printer 238 is supported above the paper sheet processing device 240 by printer supporting bodies 402 provided on right and left sides at a predetermined angle. The insertion slot 401 is coupled to an opening part of the bezel 206 (or is located in proximity thereto). When a paper sheet is inserted via the opening part of the bezel 206 from an outside of the kiosk terminal 200 (front face direction), the insertion slot 401 accepts this paper sheet and sends the paper sheet to an inside of the paper sheet processing device 240.

The ticket printer 238 is provided with a ticket ejection slot 301 and is supported by the printer supporting bodies 402 so as to allow this ticket ejection slot 301 to be located in an obliquely downward direction toward the opening part of the bezel 206.

The ticket ejection slot 301 is coupled to an upper side opening part of the guide 501 which is supported in the obliquely downward direction toward the opening part of the bezel 206 (or is located in proximity thereto). A lower side opening part of the guide 501 is coupled to the opening part of the bezel 206 (or is located in proximity thereto), and a ticket or the like, which is printed by the ticket printer 238 and delivered, is ejected from the opening part of the bezel 206 to an outside of the paper sheet processing device 240 (front face direction).

In this case, the ticket ejection slot 301 and the guide 501 constitutes an ejection part for ejecting the printed ticket or the like toward the opening part of the bezel 206. In addition, the ticket ejection slot 301 can also be coupled to the opening part of the bezel 206 (or is located in proximity thereto) without having the guide 501. In such a case, the ticket ejection slot 301 constitutes the ejection part.

Figure 6:
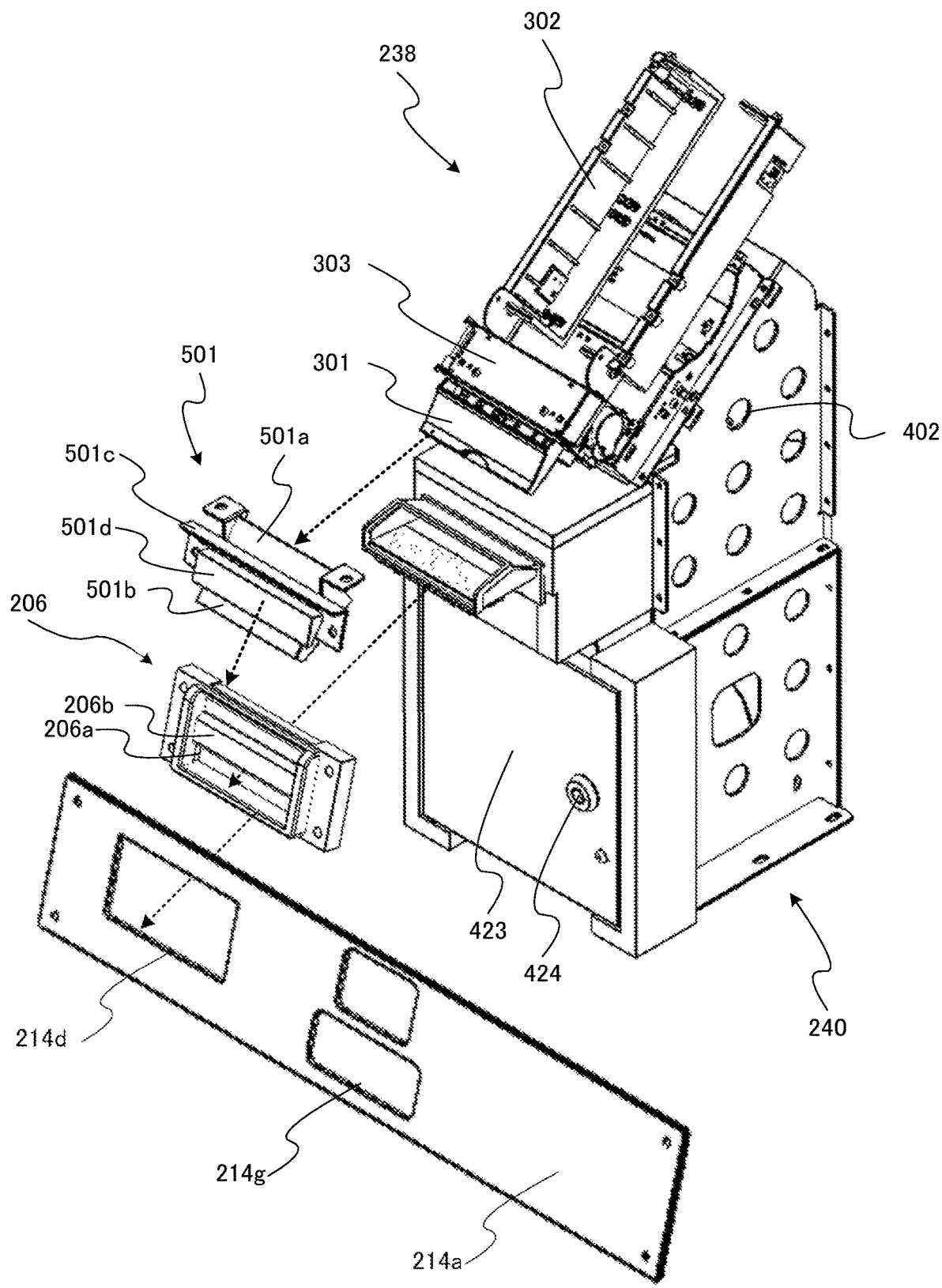
FIG. 6 is an exploded perspective view illustrating a state in which a panel, a bezel, a guide, and the ticket printer/the bill validator of the kiosk terminal according to the one embodiment of the present invention are disassembled.

FIG. 6 is an exploded perspective view illustrating the front panel 214a, the bezel 206, the guide 501, the ticket printer 238, and the paper sheet processing device 240, which are shown in FIG. 5, in a disassembled form.

The ticket printer 238 includes the above-mentioned ticket ejection slot 301, a printing paper tray 302 for housing printing paper (for example, folding paper for ticket printing), and a thermal head 303 for printing loaded printing paper by a thermal transfer method or the like.

An opening part 501a of the guide 501 is coupled to the ticket ejection slot 301 of the ticket printer 238 or is located in proximity thereto, and an opening part 501b thereof is coupled to an opening part 206a of the bezel 206 or is located in proximity thereto. A ticket or the like which is printed by the ticket printer 238 and is ejected from the ticket ejection slot 301 is supplied to the opening part 501a and thereafter, is ejected via the opening part 501b from the opening part 206a of the bezel 206 to an outside of the kiosk terminal 200. On an upper side of the opening part 206a of the bezel 206, a wall part 206b is provided.

The guide 501 is provided with an LED tape light 501c which corresponds to the above-described bezel LED 242 and is controlled to emit light in conjunction with processing contents of the ticket printer 238 and the paper sheet processing device 240. The light of the LED tape light 501c is projected to a projection part 501d, whereby the projection part 501d emits light. Since the projection part 501d is visible at the bezel 206, a user sees a light emission color or a light emission pattern of the projection part 501d and can thereby obtain some information related to printing of a ticket or the like and inserting of a paper sheet.

The front panel 214a is provided with an opening part 214d, and the bezel 206 protrudes from this opening part 214d, whereby these parts are made viewable by a user. In addition, the front panel 214a is provided with an opening part 214g, and this opening part 214g is located such that the card insertion slot 205 of the card unit 230 protrudes from the opening part 214g.

As described above, the paper sheet processing device 240 is provided with the printer supporting bodies 402 and supports the ticket printer 238. In addition, the paper sheet processing device 240 is provided with a door 423 having a key hole 424 on a front face side of the kiosk terminal 200. A key is inserted into the key hole 424, and the door 423 is unlocked and opened, thereby allowing a ticket or the like collected by the paper sheet processing device 240 to be taken out.

Figure 7:
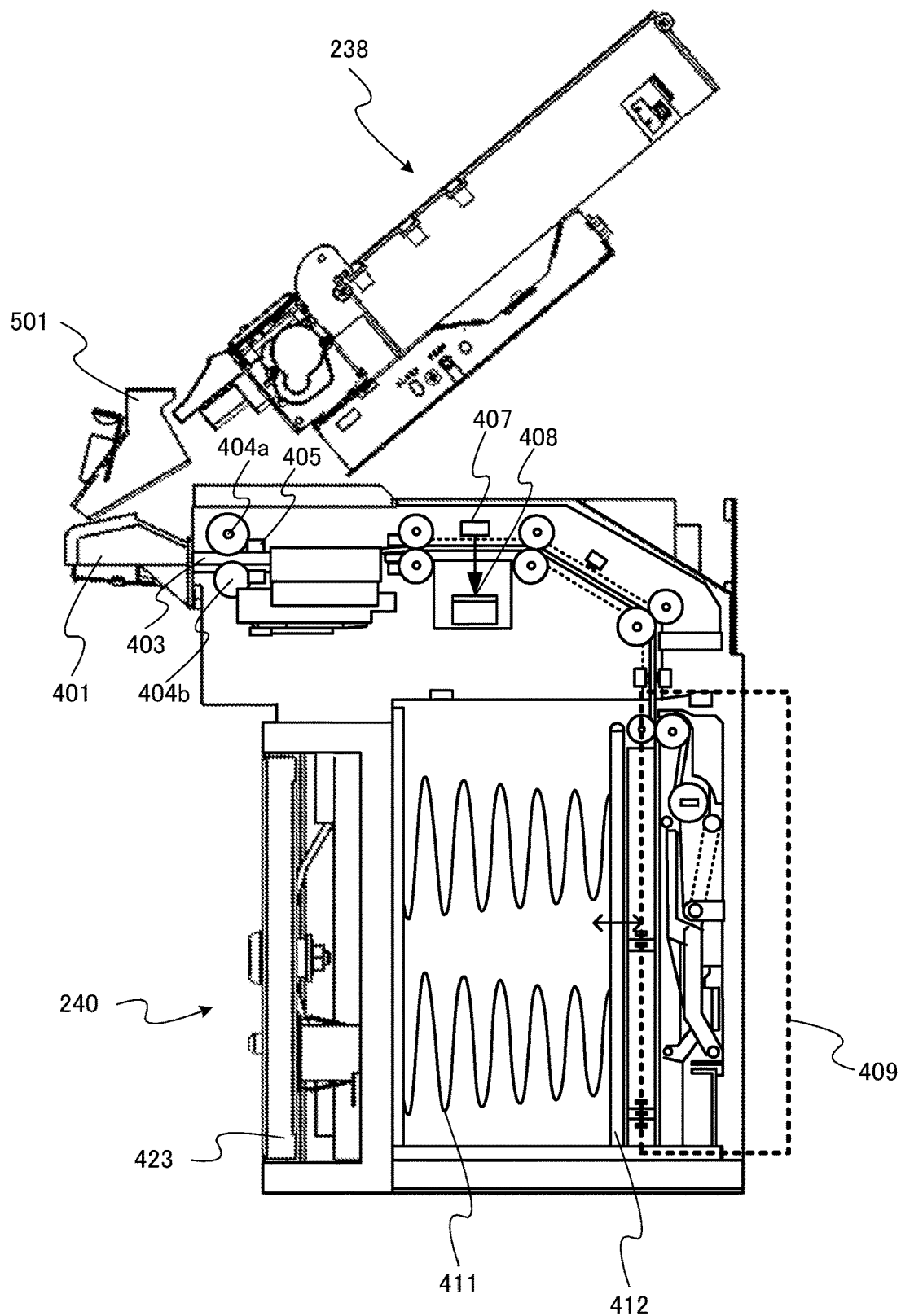
FIG. 7 is a side view illustrating the configurations of the ticket printer/the bill validator of the kiosk terminal according to the one embodiment of the present invention in more detail.

Next, with reference to FIG. 7, an outline of an internal structure of the paper sheet processing device 240 will be described. In FIG. 7, the ticket printer 238, the guide 501, and the paper sheet processing device 240 are shown. Here, FIG. 7 is a cross-sectional view illustrating a cross section of the paper sheet processing device 240, taken from a dotted line H shown in FIG. 4, in order to allow the internal structure thereof to be checked.

In the paper sheet processing device 240, upon the supplying of a paper sheet from the insertion slot 401, the paper sheet is supplied to a conveyance path 403. Conveyance rollers 402a and 402b which are located in the vicinity of the insertion slot 401 are normally in a state in which the conveyance roller 402a on an upper side is arranged apart from the conveyance roller 402b on a lower side. When the insertion of a paper sheet has been detected by an insertion detection sensor 405 or the like, the conveyance roller 402a on the upper side is driven to move toward the conveyance roller 402b on the lower side to sandwich the paper sheet.

For the paper sheet conveyed along the conveyance path 403, information or the like printed on a surface of the paper sheet is read by a light emitting unit 407 having a light emitting part and a light receiving and emitting unit 408 having a light receiving and emitting part, which is located in a position facing the light emitting unit 407, with the conveyance path being sandwiched therebetween.

The light emitting part functions as a light source for transmission and is constituted of, for example, an LED element. The light receiving and emitting part is constituted of, for example, a CCD, receives transmitted light emitted from the light emitting part of the light emitting unit 407 and reflected light or the like emitted from the light receiving and emitting part, and generates, as light receiving data, contrasting density data in accordance with a luminance of each thereof and a two-dimensional image based on the contrasting density data.

By using the two-dimensional image generated as described above, contents printed on the paper sheet are analyzed and processing in accordance with said printed contents is conducted. In a case where the paper sheet processing device 240 handles bills as a bill validator, authenticity determination or the like of the bills is conducted based on the above-mentioned two-dimensional image.

Thereafter, the paper sheet is conveyed by the plurality of conveyance rollers provided along the conveyance path 403 to a lower portion of the paper sheet processing device 240 to be collected. In the lower portion of the paper sheet processing device 240, paper sheets conveyed by a stack mechanism 409 are sequentially stacked on a placement plate 412. Here, the placement plate 412 is in a state in which the placement plate 412 is biased via a biasing device 411 from the front face of the kiosk terminal 200 toward a rear face thereof. The collected tickets or the like can be taken out by opening the door 423.

Figure 8:
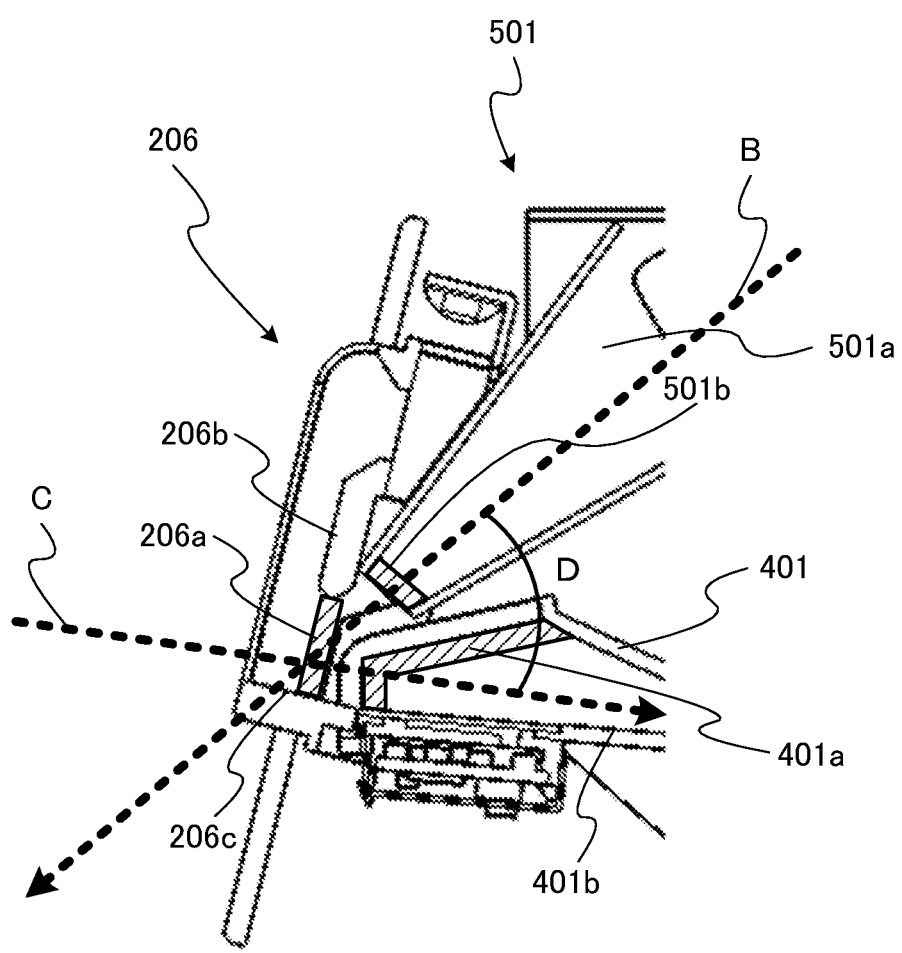
FIG. 8 is a cross-sectional view illustrating a positional relationship of the panel, the bezel, the guide, and an insertion slot of the bill validator in the kiosk terminal according to the one embodiment of the present invention.

FIG. 8 is a diagram illustrating a region A in the vicinity of the bezel 206 shown in FIG. 5 in an enlarged manner and is a cross-sectional view illustrating a cross section, taken from the dotted line H shown in FIG. 4. A dotted line arrow B shows a route (ejection path) along which a ticket or the like printed by the ticket printer 238 is ejected. The printed ticket or the like is ejected from the ticket ejection slot 301 of the ticket printer 238 toward the opening part 501a of the guide 501 and next, is guided to the opening part 501b of the guide 501.

A configuration of the guide 501 is arranged to be inswept (in other words, to be in a tapered state) from the opening part 501a toward the opening part 501b (in other words, the configuration is arranged to be in a tapered state from the ticket printer 238 toward the opening part 206a of the bezel 206), and the ticket or the like is guided to a limited position of the guide 501 to be ejected. The guide 501 is arranged in a state in which the guide 501 is tilted obliquely upward on the right side behind (depth side) of the bezel 206. Through the above-described configuration, the ticket or the like ejected from the opening part 501b of the guide 501 is ejected from the opening part 206a of the bezel 206 to the outside. In addition, at this time, there is also a case where after once contacting a lower part bottom face 206c of the bezel, the ejected ticket or the like is ejected.

A dotted line arrow C shows a route (insertion path) along which a paper sheet is inserted into the paper sheet processing device 240 and taken in. In a normal form of the insertion made by a user, the paper sheet is guided from the opening part 206a of the bezel 206 at an angle which is substantially horizontal with respect to a bottom face of the opening part 206a of the bezel 206 to be inserted. The opening part 206a of the bezel 206 is coupled to an opening part 401a of the insertion slot 401 of the paper sheet processing device 240 (or is located in proximity thereto), and the lower part bottom face 206c of the opening part 206a of the bezel 206 is located so as to be substantially horizontal with respect to the lower part bottom face 401b of the opening part 401a of the insertion slot 401 without a difference in level. Therefore, the inserted paper sheet is directly supplied via the insertion slot 401 of the paper sheet processing device 240 to an inside of the paper sheet processing device 240.

The insertion slot 401 of the paper sheet processing device 240 is configured to be inswept (in other words, to be in a tapered state) from the opening part 401a toward the paper sheet processing device 240 (in other words, to be in a reversely tapered state from the paper sheet processing device 240 toward the opening part 206a of the bezel 206).

The guide 501 is arranged in the state in which the guide 501 is tilted obliquely upward on the right side behind (depth side) of the bezel 206 and is located at the predetermined angle with respect to the insertion slot 401 of the paper sheet processing device 240, and the upper part of the opening part 206a of the bezel 206 is limited by the wall part 206b. As described above, the ejection path and the insertion path are arranged so as to have a predetermined angle. Therefore, the likelihood with which the inserted ticket or the like is erroneously supplied to the ejection path (for example, is erroneously inserted into the opening part 501b of the guide 501) is reduced, thereby allowing the situation, in which trouble such as a paper jam arises, to be effectively suppressed. In addition, the insertion path is arranged in the horizontal direction (including a substantially horizontal direction) and the ejection path is arranged above the insertion path so as to be tilted from an obliquely upper portion toward the opening part. Therefore, the likelihood with which the inserted ticket or the like is erroneously supplied to the ejection path (for example, is erroneously inserted into the opening part 501b of the guide 501) is further reduced, thereby allowing the situation, in which trouble such as a paper jam arises, to be effectively suppressed.

As shown in FIG. 8, the dotted line arrow B and the dotted line arrow C intersect with each other at a predetermined angle. In other words, the ejection path and the insertion path are configured to have a predetermined angle. In the example shown in FIG. 8, an angle formed between the dotted line arrow B indicating the ejection direction of the ejection path and the dotted line arrow C indicating the insertion direction of the insertion path is shown as an angle D. At this time, the insertion path is configured to be in a horizontal direction (including a configuration in which the insertion path is configured in a substantially horizontal direction). In addition, at this time, it is preferable that the opening part 501b of the guide 501 is located above the opening part 206a of the bezel 206 or is located above an upper edge of the opening part 206a of the bezel 206. Through the above-described configuration, the likelihood with which the inserted ticket or the like is erroneously supplied to the opening part 501b of the ticket is further reduced.

Figure 9:
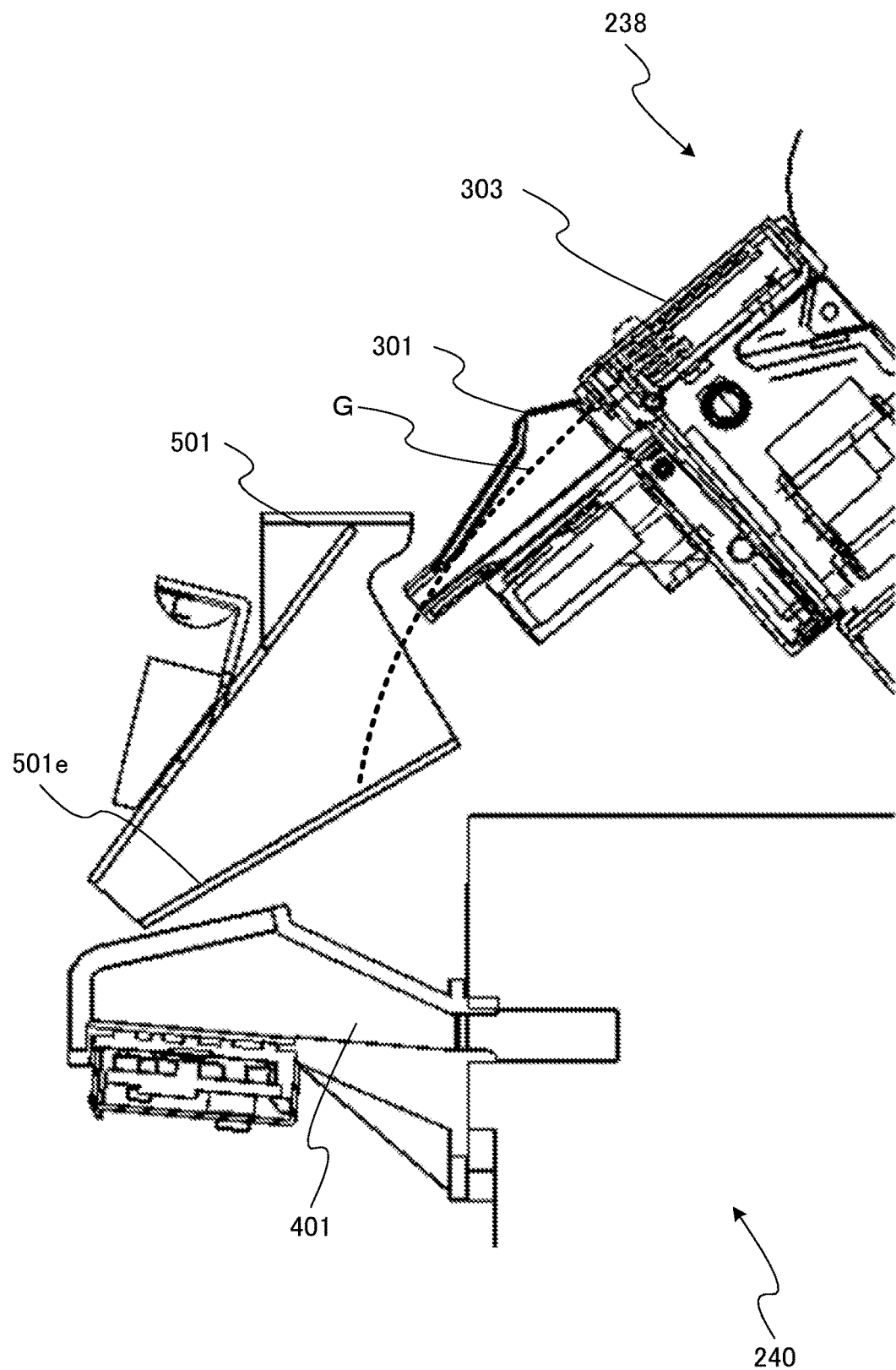
FIG. 9 is a cross-sectional view for describing warpage of printed matter ejected from the ticket printer in the kiosk terminal according to the one embodiment of the present invention.

FIG. 9 is a cross-sectional view illustrating a cross section of the guide 501, the ticket ejection slot 301 of the ticket printer 238, and the insertion slot 401 of the paper sheet processing device 240, taken from the dotted line H shown in FIG. 4. In addition, a dotted line G shows a ticket printed by the ticket printer 238 and ejected. When heat has been applied to an upper side of the ticket by the thermal head 303 of the ticket printer 238 and the printing has been thereby conducted, as shown in FIG. 9, an upper face side of this ticket warps so as to be convex, and after an edge of the ticket has contacted a lower part bottom face 501e of the guide 501, the ticket is guided to the opening part 206a of the bezel 206.

In this example, a case where as shown in FIG. 9, the upper face side of the ticket warps so as to be convex is described. However, even when a ticket is deformed in any manner in the processes of the printing, ejection, and the like, said ticket is suitably guided by the guide 501 which is configured to be in the tapered state toward the bezel 206.

[Drawer Mechanism of Middle Front Door]

Figure 10:
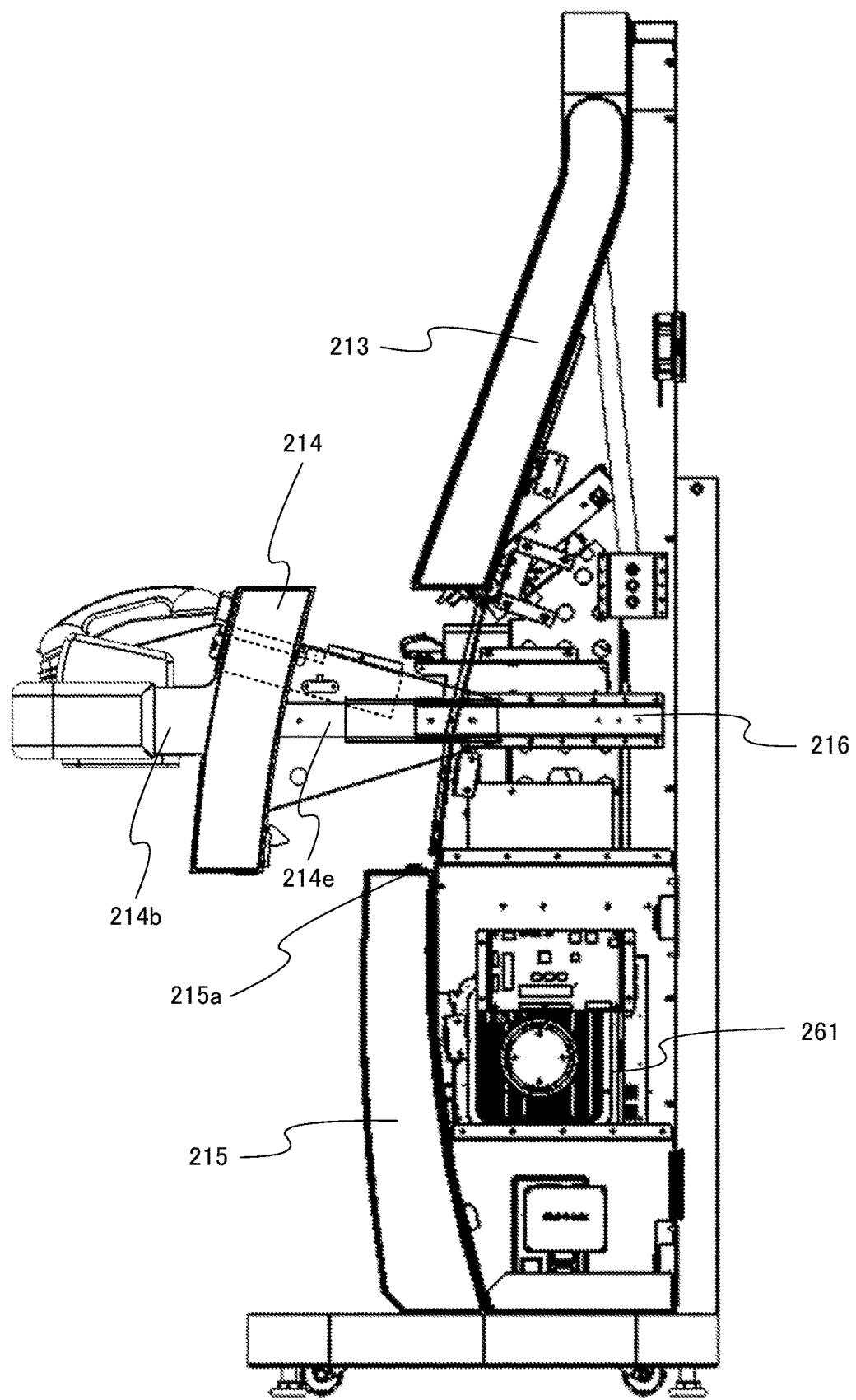
FIG. 10 is a side view illustrating a state in which a middle front door is pulled out in the kiosk terminal according to the one embodiment of the present invention.

FIG. 10 is a side view illustrating a state in which a middle front door 214 is pulled out in a front direction of a kiosk terminal 200 (in a direction indicated by an arrow R1 shown in FIG. 3). It is to be noted that in FIG. 10, in order to facilitate the description, the kiosk terminal 200 in a state in which a side panel is detached is shown.

The middle front door 214 includes a control panel 214b which is a protruding part protruding therefrom and further has slide rails 214e extending toward a rear face side of the kiosk terminal 200 (the slide rails 214e are arranged on a left side and a right side, respectively one by one).

Each of the slide rails 214e is fitted into a corresponding rail guide 216 which is held in a housing of the kiosk terminal 200. When the middle front door 214 is pulled out as shown in FIG. 10, each of the slide rails 214e moves along the corresponding rail guide 216, and with a posture of the middle front door 214 being maintained in a state in which the middle front door 214 is housed in a housing of the kiosk terminal 200, the middle front door 214 is pulled out on the front side of the kiosk terminal 200.

As described above, the middle front door 214 is pulled out, thereby allowing facilitation of work such as maintenance for a variety of kinds of devices located on a rear face of the middle front door 214 and devices and the like located on a rear side of the middle front door 214 and inside of the housing of the kiosk terminal 200. The above-described opening mechanism of the middle front door 214 is advantageous in particular in a case where there are no spaces on right and left sides of the kiosk terminal 200 (for example, a case where another kiosk terminal 200 and other apparatus are located in proximity on the right and the left sides thereof, a case where a wall and other structure are present and there is no spatial room, etc.).

For example, if hinges are provided on either of the right or left sides of the middle front door 214 and an opening mechanism is thereby configured such that the middle front door 214 is laterally opened, in the case where there is no spatial room as described above, the middle front door 214 cannot be opened. In addition, if hinges are provided at an upper end portion or a lower end portion of the middle front door 214 and an opening mechanism is thereby configured such that the middle front door 214 is opened in either of an upward or downward direction, due to the control panel 214b which is the protruding part and a variety of kinds of devices located on the front face of the control panel 214b, a sufficient opening angle cannot be ensured, thereby making the work such as the maintenance difficult.

Figure 11:
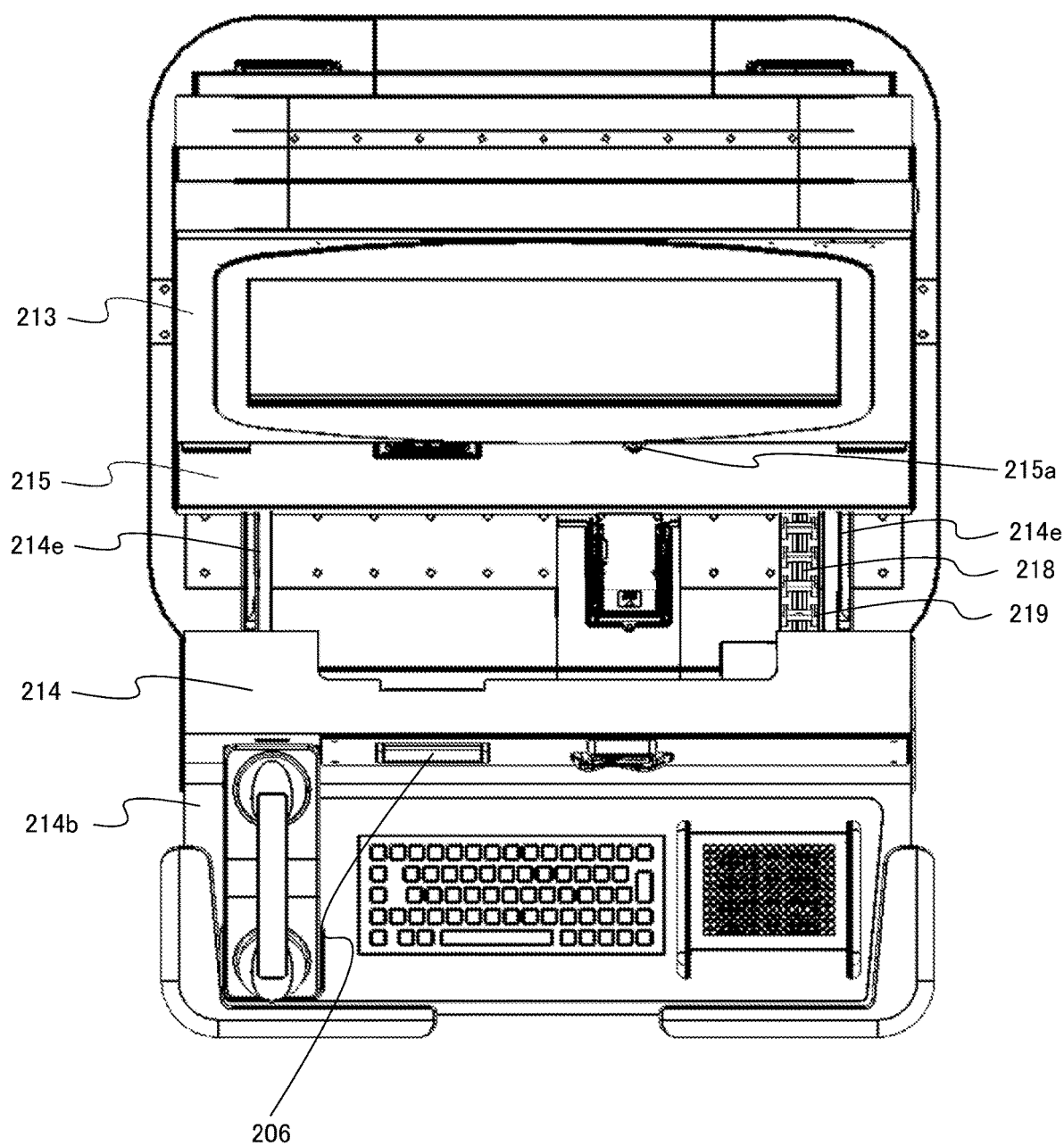
FIG. 11 is a top view illustrating a state in which the middle front door is pulled out in the kiosk terminal according to the one embodiment of the present invention.

FIG. 11 is a top view in which the kiosk terminal 200 shown in FIG. 10 is viewed from an upper direction. It is seen that as described above, the slide rails 214e are fitted into the corresponding rail guides 216, and along these rail guides 216, the middle front door 214 is pulled out.

In addition, beside the slide rail 214e on the right side, along the slide rail 214e, a plurality of cables 218 for connecting devices such as a keyboard 209 and a numeric keypad 210 provided on the middle front door 214 and a kiosk terminal controller 220 and the like of the kiosk terminal 200 are arranged. The kiosk terminal controller 220 and the like are housed inside of a control part main body 261 shown in FIG. 10, and the cables 218 are arranged in a space from this control part main body 261 to the middle front door 214.

These cables 218 are housed all together in the cable guide 219 shown in FIG. 11. As described above, the plurality of cables 218 are housed all together in the cable guide 219, whereby the multitude of cables 218 can be efficiently managed, and at the same time, upon pulling out the middle front door 214 and returning the middle front door 214 to the original position, the cables 218 can be prevented from being caught between each of the slide rails 214e and each of the rail guides 216 (refer to FIG. 10) and between the middle front door 214 and any of the other devices.

Further, since the cable guide 219 has a configuration which is deformable, even in a case where the middle front door 214 is pulled out and a distance between the respective devices provided in the middle front door 214 and the kiosk terminal controller 220 or the like of the kiosk terminal 200 is changed, the cable guide 219 can be deformed, following the movement thereof without exerting a burden on the cables 218 and breaking the cables 218. The above-mentioned configuration of the cable guide 219 will be described later.

In addition, in FIG. 11, an upper face of the lower front door 215 is shown. The upper face of the lower front door 215 is not exposed in a normal state, that is, a state in which the middle front door 214 is not opened and is a part which is not externally viewable.

Further, in FIG. 10, FIG. 11, and the later-described FIG. 15, the key hole 215a is shown. A key hole 215a is located in an upper face of a lower front door 215, and a key for detaching the lower front door 215 is inserted thereto. The key hole 215a is, as described above, configured to be exposed to the upper face of the lower front door 215 only when the middle front door 214 has been pulled out.

[Configuration of Card Unit]

Figure 12:
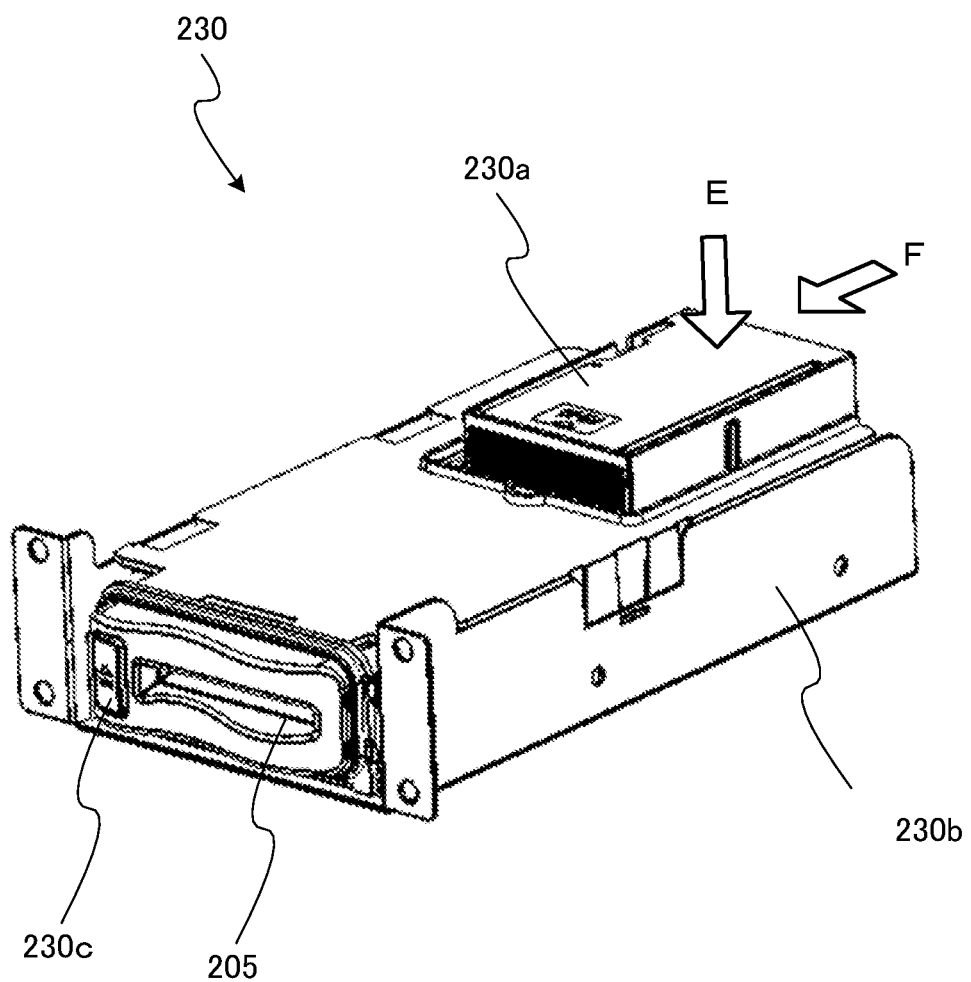
FIG. 12 is a perspective view illustrating a card unit of the kiosk terminal according to the one embodiment of the present invention.

Next, with reference to FIG. 12, a configuration of a card unit 230 will be described. The card unit 230 includes: a card insertion slot 205 into which an IC card or the like is inserted and from which a new IC card or the like is ejected; and an eject button 230c for instructing ejection of the inserted IC card. The card insertion slot 205 and the eject button 230c protrude from an opening part of a front panel 214a in a front direction of a kiosk terminal 200 and are located in positions which are viewable and operable by a user.

On a reverse side of the front panel 214a, a main body in which an IC card control part 229 is housed is located and held by a mount base 230b onto the front panel 214a or a middle front door 214. As described above, the IC card control part 229 includes an IC card R/W control part 229a and an IC card suction ejection control part 229b.

The card unit 230 further includes a card stacker 230a for storing a plurality of unissued cards, each of which is used when an IC card or the like is newly issued. Upon replenishing the unissued cards in the card stacker 230a, a staff member of a store manually perform replenishing work from an upper portion direction (arrow E) of the card stacker 230a, from a back direction of the card stacker 230a (arrow F), or the like. For example, the staff member of the store detaches a cover provided on an upper portion of the card stacker 230a and can thereby replenish IC cards. In addition, the staff member of the store detaches a cover provided on a back portion of the card stacker 230a or pulls out a card storing case from the back portion of the card stacker 230a and can thereby replenish the IC cards.

Accordingly, the replenishing work as described above is required to be performed in the state in which the middle front door 214 has been pulled out from the kiosk terminal 200 in the front direction as shown in FIG. 10. It is to be noted that at this time, it is preferable that in order to facilitate the work of replenishing the cards into the card stacker 230a, a distance at which the middle front door 214 is pulled out is longer than a depth length (a distance in a longitudinal direction) of the card unit 230.

[Opening Mechanism of Upper Front Door]

Figure 13:
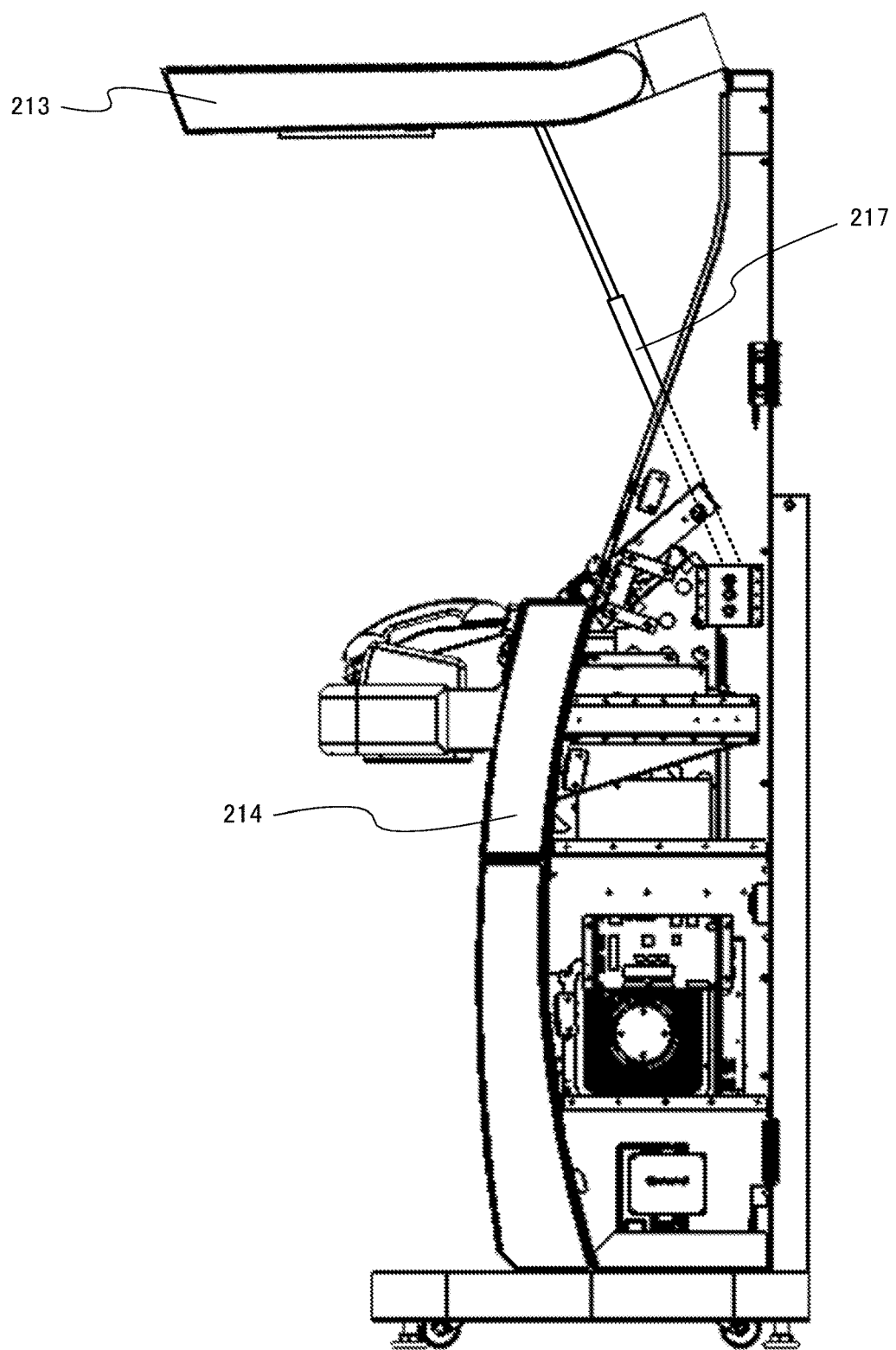
FIG. 13 is a side view illustrating a state in which an upper front door is opened in the kiosk terminal according to the one embodiment of the present invention.

FIG. 13 is a side view illustrating a state in which an upper front door 213 is flapped up in an upward direction of a kiosk terminal 200. It is to be noted that in FIG. 13, as in FIG. 10, in order to facilitate the description, the kiosk terminal 200 in a state in which a side panel is detached. It is to be noted that although as described with reference to FIG. 3, in the present embodiment, the upper front door 213 has a mechanism in which the upper front door 213 cannot be opened unless the middle front door 214 is pulled out, here, for the sake of convenience, the upper front door 213 is opened in a state in which the middle front door 214 is not pulled out.

The upper front door 213 is connected by dampers 217 with corresponding right and left side portions of a housing of the kiosk terminal 200 at the right and left side portions on an upper side of the upper front door 213, respectively. In addition, the upper front door 213 is pivotally held by hinges 213a with an upper end portion of the housing of the kiosk terminal 200 at the upper end portion of the upper front door 213.

Through the above-described configuration, when a lower end portion of the upper front door 213 is moved upward (an arrow R2 in FIG. 3), the lower end portion of the upper front door 213 rotates in an upward direction, with the center being a rotation axis which are formed by the hinges 213a, and further, the lower end portion of the upper front door 213 is lifted through biasing by the dampers 217 to a predetermined position and held at that position (the so-called hatchback type opening mechanism).

As described above, the lower end portion of the upper front door 213 is flapped up, thereby allowing facilitation of work such as maintenance for an LCD 201 provided in the upper front door 213 and for a variety of devices located on a rear side of the upper front door 213 and inside of the housing of the kiosk terminal 200. The above-described opening mechanism of the upper front door 213 is advantageous in particular in a case where there are no spaces on right and left sides of the kiosk terminal 200 (for example, a case where another kiosk terminal 200 and other apparatus are located in proximity on the right and the left sides thereof, a case where a wall and other structure are present and there is no special room, etc.).

For example, if hinges are provided on either of the right or left sides of the upper front door 213 and an opening mechanism is thereby configured such that the upper front door 213 is laterally opened, in the case where there is no spatial room on the right and left sides as described above, the upper front door 213 cannot be opened. In addition, if hinges are provided at a lower end portion of the upper front door 213 and an opening mechanism is thereby configured such that an upper end portion of the upper front door 213 is opened in a downward direction, the work such as the maintenance is made difficult.

In addition, in the present embodiment, the pulling-out of the middle front door 214 shown in FIG. 10 and the opening of the upper front door 213 in the upward direction shown in FIG. 13 can be concurrently performed. The concurrent opening of the front doors as described above is performed, thereby allowing wider maintenance work areas to be ensured and the maintenance work to be efficiently performed.

[Configuration of Cable Guide]

Next, with reference to FIG. 14, a configuration of a cable guide 219 which is deformable will be described. The cable guide 219 is constituted of a plurality of guide pieces 219a which are hollow structures formed of plastic or the like. Each of the guide pieces 219a is provided with hole parts 219b (on both right and left sides) on end portions, which are mutually rotatably fitted into end portions of another guide piece 219a; and is provided with protruding parts 219c (on both right and left sides), which are mutually rotatably fitted into hole parts 219b on end portions of further another guide piece 219a.

Figure 14A:
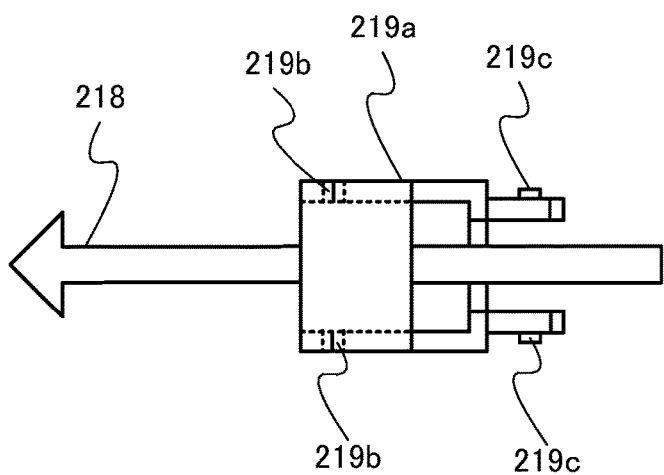
FIGS. 14A to 14C are diagrams illustrating a configuration of a cable guide used in the kiosk terminal according to the one embodiment of the present invention.
Figure 14B:
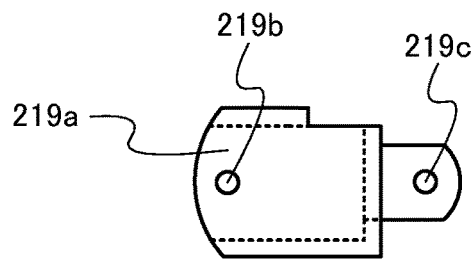
Figure 14C:
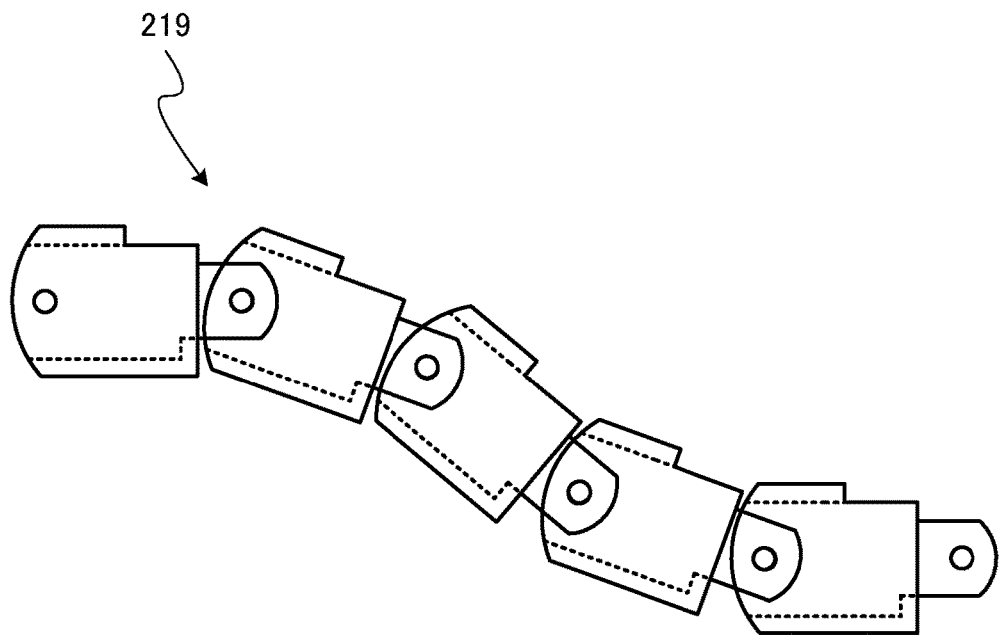

FIG. 14 (A) is a top view of each of the above-described guide pieces 219a, illustrating a view in which on the both right and left sides of each of the guide pieces 219a, the hole parts 219b and the protruding parts 219c are provided, respectively. In addition, each of the guide pieces 219a has a hollow structure, and a cable 218 penetrates through the guide pieces 219a as illustrated. FIG. 14 (A) is a side view of each of the above-described guide pieces 219a, illustrating a view in which on the right side of each of the guide pieces 219a, the hole part 219b and the protruding part 219c are provided.

The cable guide 219 is formed by mutually fitting and coupling the hole parts 219b and the protruding parts 219c of the guide pieces 219a. Through the above-described configuration, the cable guide 219 protects the cable 218 by penetrating the cable 218 through a hollow part thereof formed to be of a cylindrical shape. Further, by the hole parts 219b and the protruding parts 219c of the guide pieces 219a which are rotatably fitted, the cable guide 219 can be bent as a whole in a direction perpendicular to a rotation axis of the guide pieces 219a. As a result, the cable guide 219 becomes bendable, following the movement of a middle front door 214. In FIG. 14 (C), the cable guide 219 in which the cable guide 219 is coupled and configured is shown.

In addition, in a case where the hole parts 219b of each of the guide pieces 219a are formed to be laterally long holes or grooves and the protruding parts 219c are fitted thereinto, the respective guide pieces 219a becomes operable to move along said grooves in addition to the above-mentioned rotation, and the cable guide 219 is formed as an extendable and contractible as well as deformable structure.

Next, with reference to FIG. 15, a position where the cable guide 219 is located will be described. FIG. 15 is a perspective view in which a kiosk terminal 200 is viewed from a front obliquely left upper direction of the kiosk terminal 200, illustrating a state in which the middle front door 214 located below an upper front door 213 is pulled out in an anterior direction of the kiosk terminal 200 (a direction indicated by an arrow R1 shown in FIG. 3) and is detached. It is to be noted that in FIG. 15, in order to facilitate the description, the kiosk terminal 200 with a side panel being detached is shown.

In this example, the cable guide 219 is located on a right side inside of a housing of the kiosk terminal 200. In addition, along each of the slide rails 214e which extend from the middle front door 214 and each of the rail guides 216 held (fitted into each of the slide rails 214e) inside of the housing of the kiosk terminal 200, the cable guide 219 is located thereinside.

Figure 15:
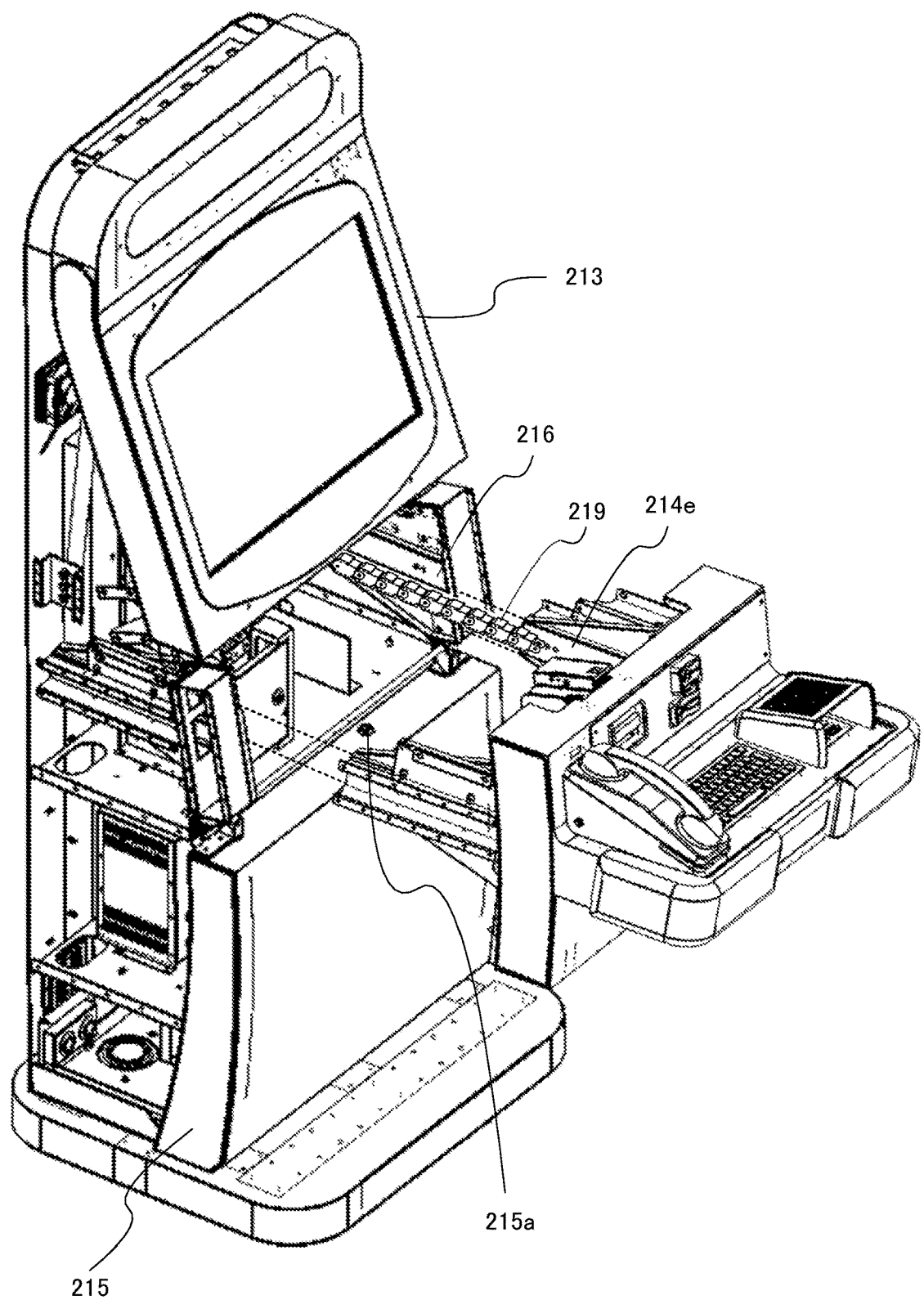
FIG. 15 is a perspective view illustrating a state in which the middle front door is detached in the kiosk terminal according to the one embodiment of the present invention.

In FIG. 15, in order to show the inside of the housing of the kiosk terminal 200 so as to be easily seen, the state in which the middle front door 214 is detached is shown. In a normal operation state, however, when the middle front door 214 is pulled out up to a maximum pulling-out position, the cable guide 219 is deformed in conjunction with the movement of the middle front door 214, whereby the cable guide 219 follows the middle front door 214 and thereby protects the cable 218 housed in the cable guide 219. In addition, in the case where the cable guide 219 is the extendable and contractible structure, when the middle front door 214 is pulled out up to the maximum pulling-out position, in conjunction with the movement of the middle front door 214, said cable guide 219 extends toward the middle front door 214 and protects the cable 218.

It is to be noted that the kiosk terminal 200 shown in FIG. 15 is in a state in which un upper face of a lower front door 215 is exposed and a key hole 215a located on the upper face of the lower front door 215 has appeared.

Hereinabove, the embodiment of the present invention is described.

Conventionally, there has been known a gaming machine such as a slot machine on which by betting a predetermined amount, a game is started; the rotation of a plurality of reels which have symbol arrays depicted on their peripheral surfaces is started; after the elapse of a predetermined time period, the rotation of the plurality of reels is stopped; and as an outcome thereof, based on a combination of symbols displayed to a player, a prize is awarded.

As shown in U.S. Unexamined Patent Application Publication No. 2010/0184511 Specification (Patent Literature 2), on a front face of a housing of the above-described gaming machine, a door part having a game display screen and the like is provided, and this door part is supported on a left end portion of the gaming machine by hinges or the like. In a case where maintenance for an inside of the gaming machine is performed or other case, the door part is opened (by rotating the door part from the right to the left in a horizontal direction) on a rotation axis which is constituted of the hinges (said rotation axis is configured to be substantially vertical on a left end of the housing of the gaming machine), thereby allowing the inside of the housing of the gaming machine to be checked.

If an information terminal (including the above-described gaming machine) for providing a user with predetermined information is configured to have the door part shown in Patent Literature 2 which is opened from the right to the left, in a case where the door part is opened for the maintenance or the like, in order to rotate said door part in the horizontal direction, it is required to ensure a certain extent of a space on a left side of the information terminal.

However, there is the situation where as to gaming machines and information terminals, said information terminals must be arranged in a row without providing no spaces on the right and left, and in the above-mentioned situation, the door part cannot be opened (or cannot be sufficiently opened), thereby causing difficulties in the maintenance work or the like.

In view of the above-described regard, an embodiment of the present invention has been made. An object thereof is to provide an information terminal which includes a door part which is configured to be slid in an anterior direction of the information terminal and pulled out, does not interfere with spaces on the right and left when said door part is opened, and facilitates the maintenance work.

The embodiment of the present invention provides an information terminal described below.

The information terminal according to a fifth aspect of the present invention has the below-described configuration.

The information terminal (for example, a kiosk terminal 200) includes:
a front face part (for example, a middle front door 214);
a protruding part (for example, a control panel 214*b*) protruding from the front face part; and
an input part (for example, a keyboard 209 and a numeric keypad 210) being placed on an upper part of the protruding part,
the front face part being arranged so as to be operable to be pulled out in an anterior direction (for example, slide rails 214*e* held by the middle front door 214 are operable to move along corresponding rail guides 216 held in a housing of the kiosk terminal 200).

By employing the above-described configuration, even when the front face part is slid and pulled out in the anterior direction and is opened, no interference in spaces on the right and left occurs. Thus, when an inside of the housing of the information terminal is checked for maintenance or the like and work is performed, the inside of the housing can be sufficiently exposed.

In the fifth aspect, the information terminal according to a sixth aspect of the present invention further has the below-described configuration.

In the front face part, an opening part from which a predetermined medium is ejected (an opening part 214*g* of a front panel 214*a* is arranged such that a card insertion slot 205 of a card unit 230 protrudes) is formed, and Inside of the housing (for example, inside of the housing of the kiosk terminal 200), a medium holding part (for example, a card unit 230) including a stacker (for example, a card stacker 230*a*) being connected to the opening part and being operable to hold a plurality of the media (for example, IC cards) is arranged.

By employing the above-described configuration, the front face part is pulled out in a state in which the medium holding part is exposed. Thus, maintenance work such as replenishment of the media into the stacker of the medium holding part is facilitated.

In the sixth aspect, the information terminal according to a seventh aspect of the present invention further has the below-described configuration.

a distance at which the front face part is pulled out in the anterior direction is configured to be longer than a depth length of the medium holding part.

By employing the above-described configuration, the front face part is pulled out until the medium holding part is set in a state in which the medium holding part is sufficiently exposed. Thus, in the maintenance work such as the replenishment of the media into the stacker of the medium holding part, surrounding spaces can be ensured, and said maintenance work can be facilitated.

In the fifth aspect, the information terminal according to an eighth aspect of the present invention further has the below-described configuration.

The input part is connected by cables (for example, cables 218) to a control part main body (for example, a control part main body 261) located inside of the housing, and when the front face part is pulled out in the anterior direction, each of the cables is housed in a cable guide (for example, a cable guide 219) which is deformed in conjunction with the pulling-out movement.

By employing the above-described configuration, even when there is the movement caused by the pulling-out of the front face part, each of the cables connecting the input part and the control part main body is protected by the cable guide. Thus, said cables can be prevented from being damaged, the damage caused by the movement by the pulling-out of the front face part.

In the fifth aspect, the information terminal according to a ninth aspect of the present invention further has the below-described configuration.

The information terminal further includes an upper side front face part (for example, an upper front door 213) located on an upper side of the front face part, the upper side front face part is supported by hinges in an upper end portion of the upper side front face part in the housing, and when the front face part is pulled out, a lower end portion of the upper side front face part is configured to be operable to flap up in an upward direction (for example, by connecting, at respective upper side right and left side parts of the upper front door 213, the lower end portion by dampers 217 to corresponding right and left side parts of the housing of the kiosk terminal 200).

By employing the above-described configuration, only when the front face part is pulled out, the upper side front face part is opened. Thus, the front face part is located in a normal position, whereby the opening of the upper side front face part is locked, the front face part itself becomes one key to open the upper side front face part, and a higher security level is realized.

In the fifth aspect, the information terminal according to a tenth aspect further has the below-described configuration.

The information terminal further includes a lower front face part (for example, a lower front door 215) located below the front face part, on an upper end of the lower front face part (for example, an upper face of the lower front door 215), a key hole (for example, a key hole 215a) into which a key for detaching the lower front face part is inserted is located, and the key hole is configured to be exposed when the front face part is pulled out.

By employing the above-described configuration, only when the front face part is pulled out, the key hole of the lower front face part is exposed. Thus, the front face part is located in the normal position, whereby the key hole of the lower front face part is closed, the front face part itself becomes one key to open the lower front face part, and a higher security level is realized.

By employing the configuration of the information terminal according to the embodiment of the present invention, the door part is slid and pulled out in the anterior direction, and when said door part is opened, no interference in spaces on the right and left occurs. Thus, when an inside of the housing of the information terminal is checked for maintenance or the like and work is performed, the inside of the housing can be sufficiently exposed.

REFERENCE SIGNS LIST

200 kiosk terminal
206 bezel
213 upper front door
214 middle front door
215 lower front door
219 cable guide
238 ticket printer
240 paper sheet processing device

The invention claimed is:

1. An information terminal, comprising:
a housing;
a first access panel that has a lowermost surface and that is mounted to the housing in a manner that permits the access panel to be withdrawn from the housing, to permit access to an interior region within the housing, while remaining mounted to the housing;
a control panel protruding from the first access panel and having a data-input mechanism located on an upper part of the control panel; and
a second access panel that has an uppermost surface and that is mounted to the housing, with the uppermost surface thereof below the lowermost surface of the first access panel, in a manner that permits the second access panel to be withdrawn from the housing so as to permit access to the interior region within the housing;
the second access panel having a first locking mechanism by means of which the second access panel can be secured to the housing and a first locking-mechanism access point by means of which the first locking mechanism can be locked and unlocked, the first locking-mechanism access point being located on an upper portion of the second access panel;
wherein the first and second access panels are cooperatively positioned and configured such that access to the first locking-mechanism access point is blocked by the first access panel until the first access panel is pulled away from the housing.

2. The information terminal according to claim 1, wherein the first locking-mechanism access point comprises a keyhole.

3. The information terminal according to claim 1, wherein at least a portion of the upper portion of the second access panel is covered by the first access panel when the first access panel is in a non-withdrawn state.

4. The information terminal according to claim 1, wherein the first access panel includes a second locking mechanism by means of which the first access panel can be secured to the housing and a second locking-mechanism access point by means of which the second locking mechanism can be locked and unlocked.

5. The information terminal according to claim 4, wherein the second locking-mechanism access point comprises a keyhole.

6. The information terminal according to claim 1, wherein the first access panel includes a second locking mechanism by means of which the first access panel can be secured to the housing and a second locking-mechanism access point by means of which the second locking mechanism can be locked and unlocked;
the first locking-mechanism access point comprises a first keyhole;
the second locking-mechanism access point comprises a second keyhole; and
the first and second keyholes are configured to accept and unlock the respective locking mechanisms by means of different keys.

7. The information terminal of claim 1, wherein the first and second access panels are mounted to the housing by means of respective mounting structures, which mounting structures are configured to allow the first and second access panels to be withdrawn from the housing in an anterior direction without lateral components of movement.

8. The information terminal of claim 1, wherein the first locking-mechanism access point is located along the uppermost surface of the second access panel.

* * * * *